US012579533B2

(12) United States Patent (10) Patent No.: US 12,579,533 B2
Wade et al. (45) Date of Patent: Mar. 17, 2026

(54) DYNAMIC TRANSACTION ALLOCATION SYSTEM FOR IN-FLIGHT CONNECTIVITY

(71) Applicant: Panasonic Avionics Corporation, Irvine, CA (US)

(72) Inventors: John Wade, Barrington Hills, IL (US); Kevin Rogers, London (GB); Marshal Perlman, Aliso Viejo, CA (US); Andrej Roncevic, Irvine, CA (US); Andrew Thompson, Rancho Mission Viejo, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 121 days.

(21) Appl. No.: 18/489,751

(22) Filed: Oct. 18, 2023

(65) Prior Publication Data

US 2025/0029089 A1 Jan. 23, 2025

Related U.S. Application Data

(60) Provisional application No. 63/515,048, filed on Jul. 21, 2023.

(51) Int. Cl.
*G06Q 20/32* (2012.01)
*B64D 11/00* (2006.01)

(52) U.S. Cl.
CPC ..... *G06Q 20/325* (2013.01); *B64D 11/00155* (2014.12)

(58) Field of Classification Search
None
See application file for complete search history.

(56) References Cited

U.S. PATENT DOCUMENTS 5,835,583 A * 11/1998 Hetz ..................... H04M 3/493
379/221.09
6,259,405 B1 * 7/2001 Stewart ............. H04M 15/8033
342/463

(Continued)

FOREIGN PATENT DOCUMENTS

EP 3220599 B1 6/2019
EP 4495873 A1 1/2025

OTHER PUBLICATIONS

"Hughes Launches New High-speed, Low-latency Satellite Service Plans for Consumers " Germantown, MD, Sep. 12, 2022, https://www.hughes.com/resources/press-releases/hughes-launches-new-high-speed-low-latency-satellite-service-plans, retrieved from the internet on Mar. 7, 2024.

(Continued)

*Primary Examiner* — William J Jacob
(74) *Attorney, Agent, or Firm* — Perkins Coie LLP

(57) ABSTRACT

A method for providing data connectivity for a passenger in a commercial passenger vehicle is provided. The method comprises: receiving, by a server onboard a commercial passenger vehicle, one or more data connectivity requests from one or more passenger electronic devices (PEDs) associated with one or more passengers; obtaining passenger information associated with the one or more passengers; performing, based on the passenger information, an authenticated communication based on the passenger information with one or more service provider candidates according to an order that defines priorities of the one or more service provider candidates such that the authenticated communication with a second service provider candidate is performed after it is determined that a first service provider candidate is unable to meet one or more constraints that are predetermined for providing wireless connection services for a PED associated with a particular passenger; establishing, based (Continued)

QoS related messages, including accounting, auction, QoS information, etc.

Airline 1   Airline 2   Airline 3   Airline 4   Airline 5  · · ·  Airline N on the authenticated communication, data connectivity for the PED associated with the particular passenger.

18 Claims, 12 Drawing Sheets

(56)                References Cited

U.S. PATENT DOCUMENTS

| | | | |
|---|---|---|---|
| 8,305,996 B2 | 11/2012 | Rahman et al. | |
| 8,353,000 B2 | 1/2013 | He et al. | |
| 9,480,093 B2 | 10/2016 | Fan et al. | |
| 9,681,336 B2 | 6/2017 | Wang et al. | |
| 9,729,576 B2 | 8/2017 | Lang et al. | |
| 9,872,154 B2 | 1/2018 | Margis | |
| 9,992,710 B2 | 6/2018 | Shalev et al. | |
| 11,115,810 B1 | 9/2021 | Indurkar | |
| 11,855,986 B2 | 12/2023 | Olshansky | |
| 2012/0082084 A1 | 4/2012 | Balakrishnan et al. | |
| 2013/0064221 A1 | 3/2013 | Pampu et al. | |
| 2014/0233380 A1 | 8/2014 | Kim et al. | |
| 2014/0307651 A1 | 10/2014 | Sarikaya et al. | |
| 2015/0056960 A1* | 2/2015 | Egner | H04W 4/027 |
| | | | 455/411 |
| 2016/0162810 A1* | 6/2016 | Howe | G06Q 50/14 |
| | | | 705/5 |
| 2016/0277532 A1 | 9/2016 | Lee et al. | |
| 2016/0301731 A1* | 10/2016 | Loeb | H04L 65/80 |
| 2017/0272972 A1* | 9/2017 | Egner | H04L 47/2441 |
| 2021/0243696 A1* | 8/2021 | Sanaullah | H04W 52/0258 |
| 2022/0030038 A1 | 1/2022 | Condoluci et al. | |
| 2023/0180088 A1 | 6/2023 | Lee et al. | |

OTHER PUBLICATIONS

"Hughes launches OneWeb LEO in-flight solutions to airlines worldwide, announces global distribution partnership with OneWeb," Hamburg, Germany, Aircraft Interiors Expo, Booth 4C40, Jun. 5, 2023, https://oneweb.net/resources/hughes-launches-oneweb-leo-flight-solutions-airlines-worldwide-announces-globa, retrieved from the internet on Mar. 7, 2024.

Extended European Search Report issued in corresponding European Patent Application No. 24189802.2 mailed Oct. 10, 2024 (12 pages).

"With Hughes V.P. of Mobility, Reza Rasoulian Hughes Unveils Fusion Powered, GEO-LEO Inflight Wi-Fi," Satellite Mobility, Jul., Aug. 2023, pp. 41-42.

Nomadix, Inc. "Nomadix Earns Patent for Enhancing Passpoint (Hotspot 2.0) with Loyalty Program Integrations: Enabling Digital Engagement and Tiered, Location-Based Services for Visitor-Based Networks," Information Technology, Feb. 6, 2024, https://www.hospitalitynet.org/news/4120292.html, retrieved from the internet Mar. 7, 2024.

Nomadix, "Nomadix Earns Patent for Enhancing Passpoint (Hotspot 2.0) With Loyalty Program Integrations: Enabling Digital Engagement and Tiered, Location-Based Services for Visitor-Based Networks,," Feb. 6, 2024, https://staging.hotel-online.com/press_releases/release/nomadix-earns-patent-for-enhancing-passpoint-hotspot-2-0-with-loyalty-program-integrations/, retrieved from the internet Mar. 7, 2024.

* cited by examiner

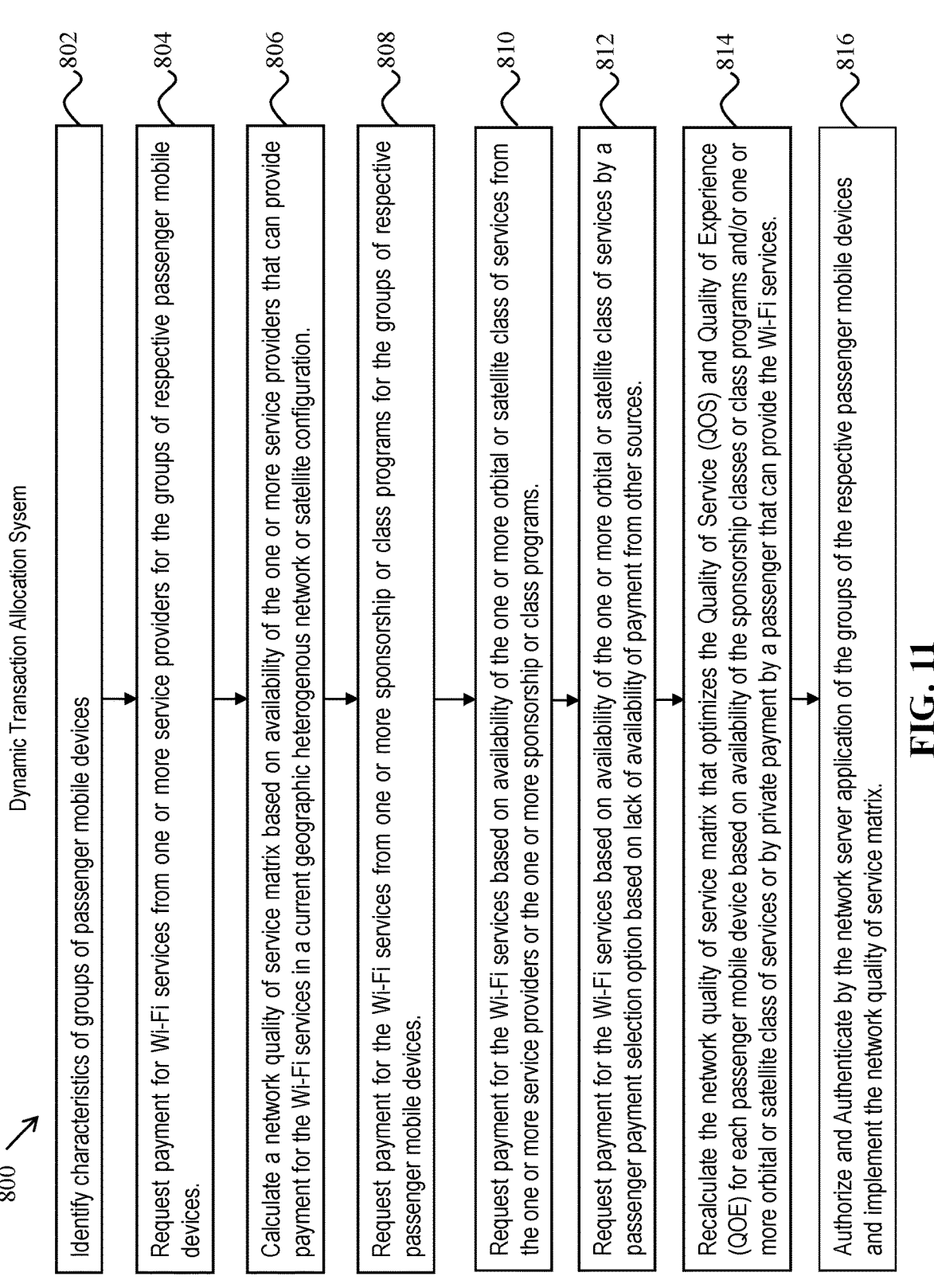

800

Dynamic Transaction Allocation Sysem

Identify characteristics of groups of passenger mobile devices
802

Request payment for Wi-Fi services from one or more service providers for the groups of respective passenger mobile devices.
804

Calculate a network quality of service matrix based on availability of the one or more service providers that can provide payment for the Wi-Fi services in a current geographic heterogenous network or satellite configuration.
806

Request payment for the Wi-Fi services from one or more sponsorship or class programs for the groups of respective passenger mobile devices.
808

Request payment for the Wi-Fi services based on availability of the one or more orbital or satellite class of services from the one or more service providers or the one or more sponsorship or class programs.
810

Request payment for the Wi-Fi services based on availability of the one or more orbital or satellite class of services by a passenger payment selection option based on lack of availability of payment from other sources.
812

Recalculate the network quality of service matrix that optimizes the Quality of Service (QOS) and Quality of Experience (QOE) for each passenger mobile device based on availability of the sponsorship classes or class programs and/or one or more orbital or satellite class of services or by private payment by a passenger that can provide the Wi-Fi services.
814

Authorize and Authenticate by the network server application of the groups of the respective passenger mobile devices and implement the network quality of service matrix.
816

FIG. 11

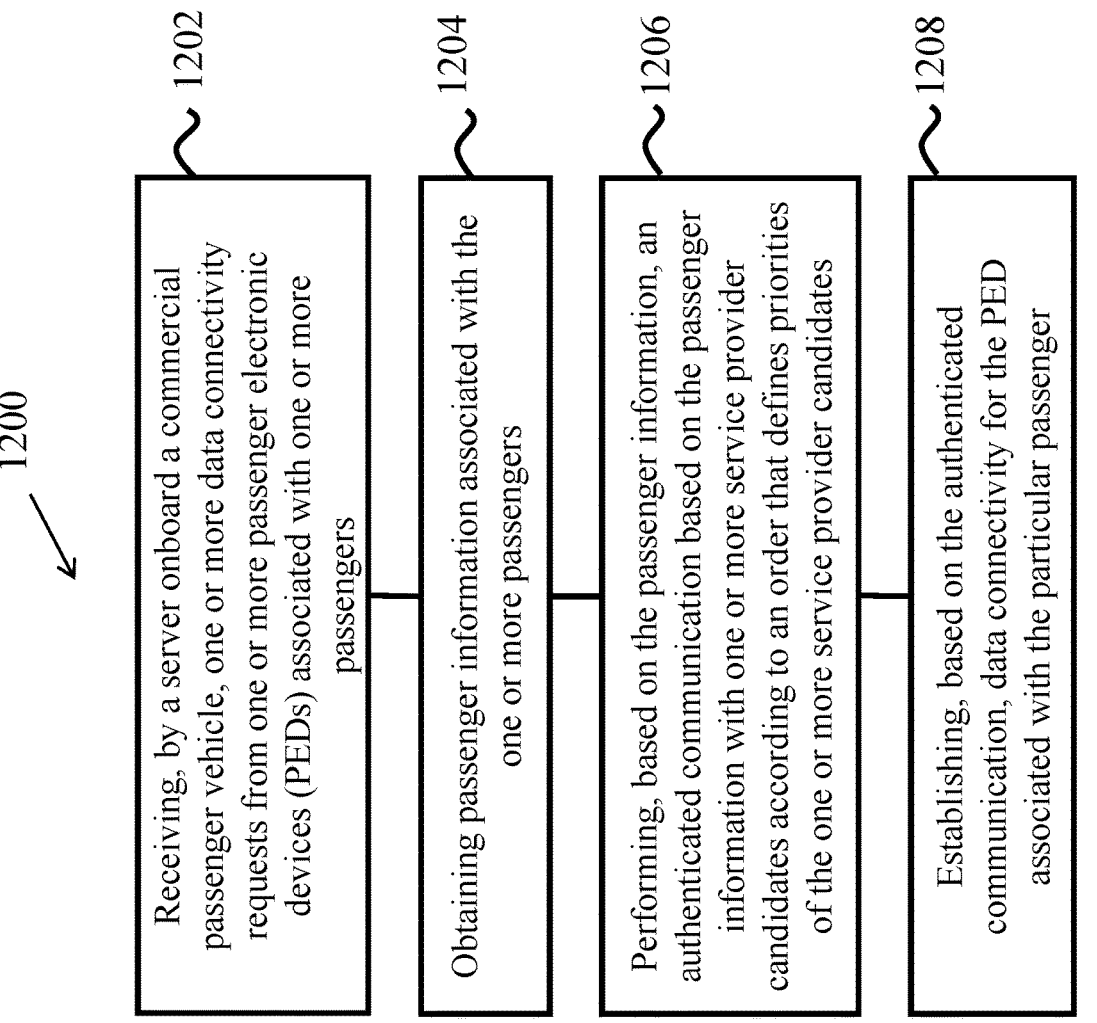

1200

1202 Receiving, by a server onboard a commercial passenger vehicle, one or more data connectivity requests from one or more passenger electronic devices (PEDs) associated with one or more passengers 1204 Obtaining passenger information associated with the one or more passengers 1206 Performing, based on the passenger information, an authenticated communication based on the passenger information with one or more service provider candidates according to an order that defines priorities of the one or more service provider candidates 1208 Establishing, based on the authenticated communication, data connectivity for the PED associated with the particular passenger

FIG. 12

DYNAMIC TRANSACTION ALLOCATION SYSTEM FOR IN-FLIGHT CONNECTIVITY

CROSS-REFERENCE TO RELATED APPLICATIONS

This application claims priority to, and the benefit of, U.S. Provisional Application No. 63/515,048, titled DYNAMIC TRANSACTION ALLOCATION SYSTEM FOR IN-FLIGHT CONNECTIVITY and filed on Jul. 21, 2023. The aforementioned application is herein incorporated in its entirety, including any drawings and appendices.

TECHNICAL FIELD

This document is generally related to systems, methods, and apparatus for providing in-flight connectivity.

BACKGROUND

Commercial travel has evolved with the increasing popularity of personal electronic devices (PEDs) that passengers carry on board, as well as media player devices provided in commercial passenger vehicles. Furthermore, most modern commercial passenger vehicles include communication and display electronics, commonly referred to as in-flight entertainment and communication (IFEC) equipment.

SUMMARY

This patent document describes, among other things, various implementations for providing digital connectivity to passenger electronic devices (PEDs).

In one aspect, a method for providing data connectivity for a passenger in a commercial passenger vehicle is provided. The method comprises: receiving, by a server onboard a commercial passenger vehicle, one or more data connectivity requests from one or more passenger electronic devices (PEDs) associated with one or more passengers; obtaining passenger information associated with the one or more passengers; performing, based on the passenger information, an authenticated communication based on the passenger information with one or more service provider candidates according to an order that defines priorities of the one or more service provider candidates such that the authenticated communication with a second service provider candidate is performed after it is determined that a first service provider candidate is unable to meet one or more constraints that are predetermined for providing wireless connection services for a PED associated with a particular passenger; establishing, based on the authenticated communication, data connectivity for the PED associated with the particular passenger.

In another aspect, a system for providing data connectivity for a passenger in a commercial passenger vehicle is provided. The system comprises: a server located in the commercial passenger vehicle and configured to communicate with a ground server outside of the commercial passenger vehicle and a passenger device associated with a passenger, wherein the server includes: a real-time communication component configured to perform an authenticated communication with one or more service provider candidates according to an order that defines priorities of the one or more service provider candidates such that the authenticated communication with a second service provider candidate is performed after it is determined that a first service provider candidate is unable to meet one or more constraints that are predetermined for providing wireless connection services for a PED associated with a particular passenger; a processor configured to calculate service performance metrics to satisfy predetermined conditions related to quality of the wireless connection services to be provided to the PED; and an interface that is configured to establish, based on the authenticated communication and the service performance metrics, data connectivity for the PED associated with the particular passenger.

In another aspect, a computer-readable storage medium is provided. The computer-readable storage medium has code stored thereon, the code, upon execution by one or more processors, causing the one or more processors to implement a method comprising: receiving one or more data connectivity requests from one or more passenger electronic devices (PEDs) associated with one or more passengers; obtaining passenger information associated with the one or more passengers; performing, based on the passenger information, an authenticated communication based on the passenger information with one or more service provider candidates according to an order that defines priorities of the one or more service provider candidates such that the authenticated communication with a second service provider candidate is performed after it is determined that a first service provider candidate is unable to meet one or more constraints that are predetermined for providing wireless connection services for a PED associated with a particular passenger; establishing, based on the authenticated communication, data connectivity for the PED associated with the particular passenger. In another exemplary aspect, the disclosed methods may be implementing one or more processors that are included in one or more hardware platforms.

In yet another exemplary aspect, the above-described method is embodied in the form of processor-executable code and stored in a computer-readable program medium. The code, upon execution by one or more processors, causes the one or more processors to implement a method described herein.

The above and other aspects and their implementations are described in greater detail in the drawings, the description, and the claims.

BRIEF DESCRIPTION OF THE DRAWINGS

FIG. 11 shows another example flowchart of operations that are performed by a DTAS for groups of passenger devices based on some implementations of the disclosed technology.

FIG. 12 shows an example flowchart of a method of providing data connectivity for passengers in commercial passenger vehicle based on some implementations of the disclosed technology.

DETAILED DESCRIPTION

Figure 1:
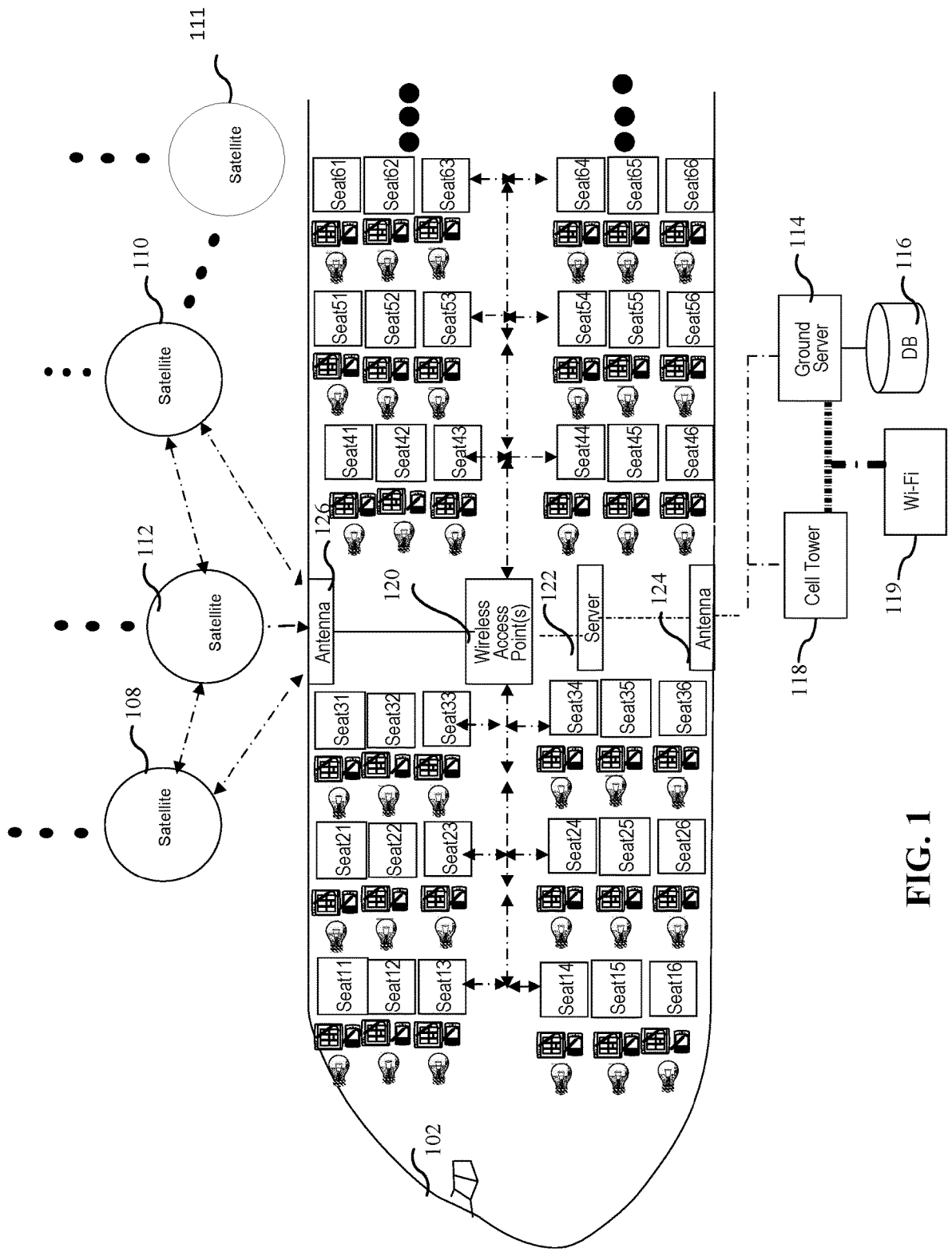
FIG. 1 shows an example of an in-flight entertainment (IFE) system installed in an airplane based on some implementations of the disclosed technology.

Various implementations of the disclosed technology provide dynamic transaction allocation techniques for in-flight connectivity for passengers in a commercial passenger vehicle.

Recent advances in wireless technologies have made wireless connection services such as on-board Wi-Fi or Bluetooth® connections available during travel in a commercial passenger vehicle such as an airplane or train. Unlike the past when a passenger was not provided with wireless connection services onboard during travel, onboard wireless connection services are available in many commercial vehicles so that passengers can share their trips on social media and business travelers can use their flight time more productively.

A captive portal is an intermediate web page that appears to users seeking to connect to public networks like Wi-Fi hotspots, before they are granted internet access. The captive portal technology is prevalent in public places such as aircraft, airports, hotels, and cafes providing free or paid internet services. The portals serve to authenticate users, display terms of service agreements, collect user data, and manage network access. When users connect and attempt to visit a webpage or use an online resource, their browser is redirected to the portal. Users typically need to undertake an action, such as accepting terms and conditions, entering login credentials, supplying personal data, or making a payment. On completion of these steps, they are granted internet access for a specified duration or until they log out. Portals can enable internet access with bandwidth or time restrictions or monetize the network by offering paid access or advertising-based access. The captive portals are useful in maintaining security measures and preventing unauthorized network access. The current portal process often involves manual intervention, requiring users to actively engage and complete various steps to gain access to the network.

Various entities often offer free and/or paid connectivity options, where free access is limited to essential services (e.g., texting and slow web surfing) and paid access avails higher speeds for various activities (fast web surfing and video streaming). While the idea of free internet access is enticing, it comes with costs absorbed by the connectivity provider and/or their customers (e.g., a hotel). For in-flight or at-sea internet access, these costs are substantially high due to satellite-based connectivity needs. Even conventional (terrestrial) connectivity services (fiber, cable, cellular)

involve costs that needs to be accounted for. Some service providers have adopted a sponsorship model, where an advertiser covers the internet access cost in exchange for users viewing an advertisement. However, the current sponsorship model is not yet dynamic, seamless, or automated. Current models used by wireless connection service providers, e.g., Wi-Fi service providers, lack flexibility and scalability, and often hinder seamless connectivity.

In recognition of the limitations of the current sponsorship model and the portals, the disclosed technology provides various implementations to address the above issues and provide dynamic transaction allocation techniques for wireless data connectivity for passengers in a commercial passenger vehicle. Some implementations of the disclosed technology simplify wireless service connectivity by enabling devices to automatically join trusted networks, eliminating the need for frequent manual credential entry, and providing an uninterrupted user experience. Some implementations of the disclosed technology enhance the user experience of joining wireless networks and offer varied cost coverage options for providers, including WIPS, airlines, hotels, cafes, and others. The dynamic transaction allocation techniques can be supported by AI (artificial intelligence) or similar technology, to employ dynamic decision-making capabilities, underpinned by diverse payment sources. The dynamic transaction allocation techniques simplify user experience for passengers while at the same time allow airlines and operators of inflight entertainment (IFE) systems to personalize and prioritize offerings such as data connectivity to passengers.

Various implementations of the disclosed technology provide techniques that can streamline and automate a dynamic transaction allocation for in-flight connectivity. The implementations of the disclosed technology ensure a seamless user experience, where individuals can effortlessly join the network without manual intervention. In addition, some implementations of the disclosed technology allow to provide an enhanced version of transaction allocation by offering the ability to leverage alternative payment methods for those who are unable to be automatically connected to the wireless connection services. Some implementations of the disclosed technology allow to automatically select a sponsorship or "payment" method for wireless connection services for passengers. Such selection for the wireless connection services can be made based on various factors as provider preferences, user loyalty status, targeted advertising (potentially leveraging user demographics, behavior, and interests), or others. Various algorithms can be applied to select the sponsorship or payment method to provide the best option for a passenger to use wireless connection services. The implementations of the disclosed technology can streamline connectivity by enhancing the user experience and maximizing revenue for service providers (e.g., an airline) and/or their customers.

Various implementations will be discussed in detail with reference to the figures below. In the description, an airplane is described as an example of the passenger vehicle, but the implementations of the disclosed technology can be applicable to other passenger vehicles such as buses, trains, ships, and other types of commercial passenger vehicles.

FIG. 1 shows an example of an in-flight entertainment (IFE) system installed in an airplane 102. The IFE system provides various entertainment and connectivity services to passengers on board. Referring to FIG. 1, the IFE system includes a server 122, antenna 126, and antenna 124. The components shown as a single element in FIG. 1 (e.g., the server 122, the wireless access point 120, etc.) can be configured in multiple elements. For example, the in-flight service system can include multiple wireless access points to facilitate or support providing wireless coverages for the passengers. The passengers carry their own devices, which include the PEDs (illustrated by the light bulb icon in FIG. 1) and other wireless electronic devices. The PEDs may refer to any electronic computing device that includes one or more processors or circuitries for implementing the functions related to data storage, video and audio streaming, wired communications, wireless communications, etc. The examples of the PEDs include cellular phones, smart phones, tablet computers, laptop computers, and other portable computing devices. In the implementations of the disclosed technology, the PEDs may have the capability to execute application software programs ("apps") to perform various functions.

In FIG. 1, the airplane 102 is depicted to include multiple passenger seats, Seat 11 to Seat 66. The media playback devices (illustrated by screen icon) are provided at each passenger seat and configured with capabilities for video and audio streaming, Internet communications, and other capabilities. In some implementations, the media playback devices are provided at each passenger seat, such as located at each of the seatbacks of the passenger seats, and/or on cabin walls and/or deployable from an armrest for seats located at a bulkhead (i.e., in the first row of a section). The media playback devices have displays providing interfaces to each passenger through which each passenger enters his or her selections on the entertainment option, e.g., the particular selections, emergency requests, etc. Upon receiving the selection from the passengers, based on the selections from the passengers, the media playback device displays entertainment content and travel information. In the implementations, to assist the dynamic transaction allocation for the wireless connection services for the passengers, various graphic user interface (GUI) functions can be suggested and displayed on the media playback devices.

The server 122 is communicably coupled with media playback devices and the PEDs and perform various operations including processing requests/inputs from passengers and providing data to passengers. The communications between the server 122 and the passengers' onboard devices including the media playback devices and the PEDs are either realized by wired connections or wireless connections. In some implementations, the communication among the server 122, the media playback devices, and the PEDs are achieved through the antenna 124 to and from the ground-based cell towers 118 by, for example, a provision of network plugs at the seat for plugging PEDs to a wired onboard local area network. In some other implementations, the communications among the server 122, the media playback devices, and the PEDs are achieved through the antenna 126 to and from satellites 108, 110, 111, 112 in an orbit (e.g., via a cellular network utilizing one or more onboard base station(s), Wi-Fi utilizing the wireless access point 120, and/or Bluetooth®).

In some implementations, a crew terminal is provided in the airplane 102 utilized by a ground crew, a cabin crew, or a flight crew to access the IFE maintenance functions such as loading new content, replenishing multimedia content digital rights management (DRM) keys, and so on. The crew terminal is in communication with other devices of the IFE system such as the server 122, media playback devices, the PEDs, and the ground server. In some implementations, the crew terminal can be implemented as a part of the server 122. In some implementations, the crew terminal is in communication with the gate terminal to facilitate the dynamic transaction allocation. In some implementations, the gate terminal and the onboard crew terminal store apps to support the dynamic transaction allocation. The gate terminal and the crew terminal are typically accessed by a gate agent or a crew member responsible for overseeing boarding operation. User ID and passwords may be required to authorize the access to the gate terminal and the onboard crew terminal to facilitate identifying of the agent or crew member conducting the boarding operation and to prevent unauthorized access to the system.

The server 122, the media playback devices, and the PEDs form a local network on board the airplane 102 through an onboard router (not shown). The server 122 is also communicably coupled with the ground server 114 through the antenna 126 for receiving and transmitting information from/to the ground server 114. In some examples, cell towers 118 communicate or interface with the antenna 124 of the airplane 102, such that ground systems such as the ground server 114, the database 116, and the gate terminal can transmit and receive data with the server 122 and other in-vehicle systems. In some implementations, Wi-Fi element 119 provides a wireless local area network (WLAN) to allow the server 122 to communicate with the ground systems. Thus, the cell tower 118 and the Wi-Fi element 119 may act as communication nodes between the antenna 124 of the airplane 102 and the ground systems such as the ground server 114, the databases 116, and the ground terminal. The ground server 114 can be located at various locations, including a gate where passengers check-in the boarding pass right before passengers are on board, a computer center at an arbitrary location on the ground, etc. In some examples, the gate terminal may correspond to the ground server 114 located at the gate and thus can be one example of the ground server 114. The ground server 114 may be in communication with the database 116 and provide information from the database 116 to the server 122 and store information received from the server 122 in the database 116. Although FIG. 1 shows that the database 116 is provided separately from the ground server 114, the database 116 can be provided as a part of the ground server 114.

Although not shown in FIG. 1, the IFE system may further include a database which stores passenger information, for example, profiles of the passengers (name, age, etc.), preferred entertainment options (movies, music, shows, etc.), preferred entertainment content (e.g., genres of movies), etc. The passenger information can be obtained in multiple manners and is stored in the database of the IFE system. In some implementations, the passenger information is obtained prior to the passengers coming on board (e.g., at the time of purchasing the tickets or checking in for the flights), or at other times. In some implementations, the passenger information can be obtained and shared by an association of several airplane companies and retrieved from the database 116. In some implementations, the passenger information can be updated during the travel of the airplane 102.

Figure 2:
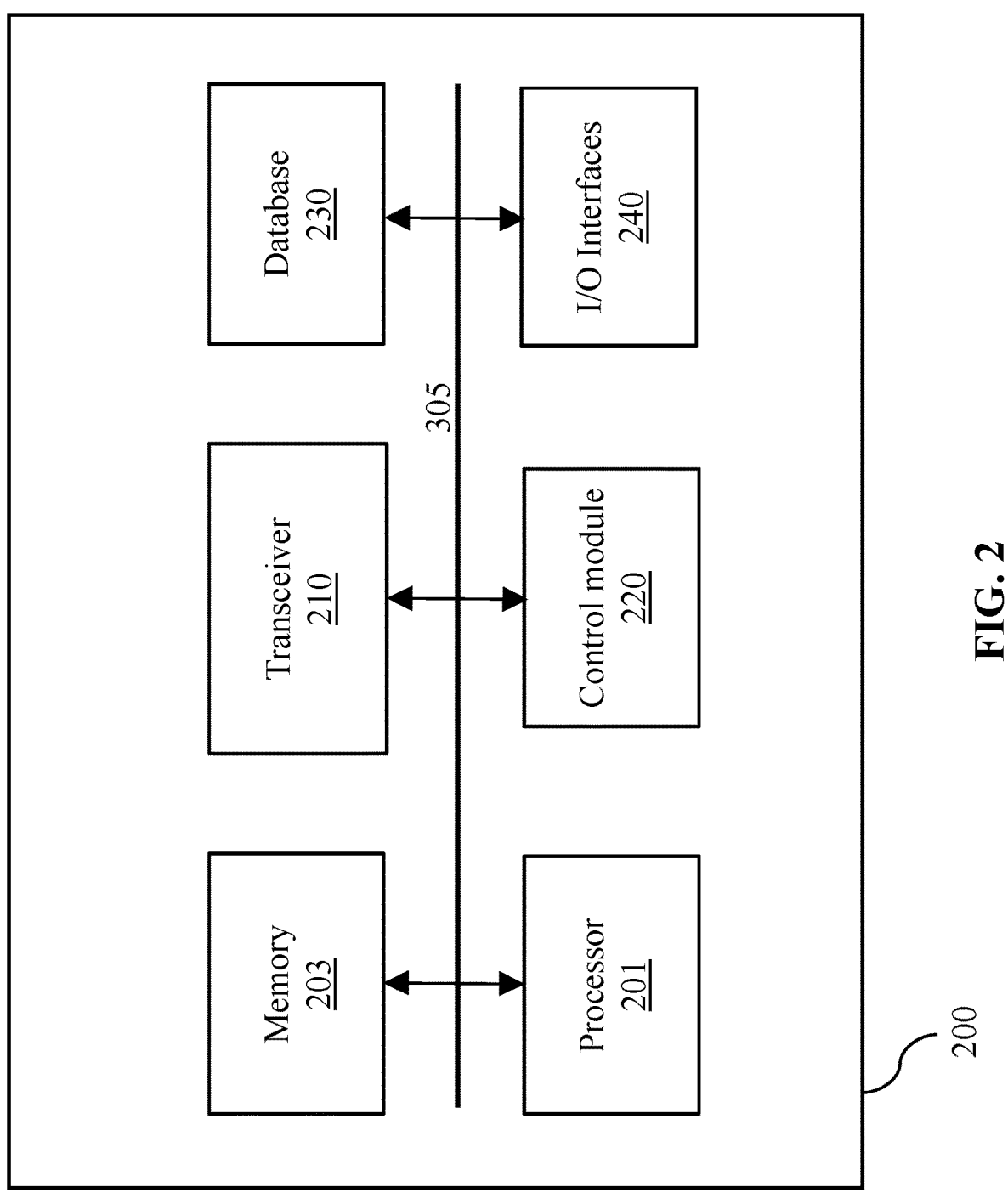
FIG. 2 shows an example block diagram of a computing device based on some implementations of the disclosed technology.

FIG. 2 shows an example block diagram of a computing device (e.g., an onboard server, a PED, a ground server, or a crew terminal) based on some implementations of the disclosed technology. The computing device 200 includes at least one processor 201, a memory 203, a transceiver 210, a control module 220, a database 230, and an input/output (I/O) interface 240. In other embodiments, additional, fewer, and/or different elements may be used to configure the computing device 200. The memory 203 may store instructions and applications to be executed by the processor 201. The memory 203 is an electronic holding place or storage for information or instructions so that the information or instructions can be accessed by the processor 201. The memory 203 can include, but is not limited to, any type of random access memory (RAM), any type of read-only memory (ROM), any type of flash memory, such as magnetic storage devices (e.g., hard disk, floppy disk, magnetic strips, etc.), optical disks (e.g., compact disc (CD), digital versatile discs (DVD), etc.), smart cards, flash memory devices, etc. The instructions upon execution by the processor 201 configure the computing device 200 to perform the operations, which will be described in this patent document. The instructions executed by the processor 201 may be carried out by a special purpose computer, logic circuits, or hardware circuits. The processor 201 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 201 can perform the operations called for by that instruction.

The processor 201 operably couples with the memory 203, the transceiver 210, the control module 220, the database 230, and the I/O interface 240, to receive, send, and process information and to control the operations of the computing device 200. The processor 201 may retrieve a set of instructions from a permanent memory device, such as a ROM device, and copy the instructions in an executable form to a temporary memory device that is generally some form of RAM. In some implementations, the computing device 200 can include a plurality of processors that use the same or a different processing technology. The transceiver 210 may include a transmitter and a receiver. In some embodiments, the computing device 200 comprises a transmitter and a receiver that are separate from one another but functionally form a transceiver. The transceiver 210 transmits or sends information or data to another device (e.g., another server, a PED, etc.) and receives information or data transmitted or sent by another device (e.g., another server, a PED, etc.). As will be discussed later, the implementations of the disclosed technology provide data connection services across multiple heterogenous networks including LEO, GEO, and/or MEO, each having a respective authentication, authorization and accounting (AAA) function, by determining a sponsorship for the payment of the data connection services for the pass. The determining of the sponsorship may be based on the type of the transceiver, e.g., whether the airplane has a single channel transceiver or a dual channel transceiver.

The control module 220 of the computing device 200 is configured to perform operations to assist the computing device 200. In some implementations, the control module 220 can be configured as a part of the processor 201. When the computing device 200 corresponds to the IFE system as shown in FIG. 1, the control module 220 can be included in the airplane 102. In some implementations, the control module 220 can operate machine learning/artificial intelligence (AI) applications that perform various types of data analysis to automate analytical model building. Using algorithms that iteratively learn from data, machine learning applications can enable computers to learn without being explicitly programmed. The machine learning/AI module may be configured to use data learning algorithms to build models to interpret various data received from the various devices or components to detect, classify, and/or predict future outcomes. Such data learning algorithms may be associated with rule learning, artificial neural networks, inductive logic programming, and/or clustering. In some implementations, the control module 220 may assist the computing device 200 to perceive their environment and take actions that maximize the effectiveness of the operations performed by the computing device 200.

The I/O interfaces 240 enable data to be provided to the computing device 200 as input and enable the device computing device 200 to provide data as output. In some embodiments, the I/O interfaces 240 may enable user input to be obtained and received by the computing device 200 (e.g., via a touch-screen display, buttons, or switches) and may enable the computing device 200 to display information. In some embodiments, devices, including touch screen displays, buttons, controllers, audio speakers, or others, are connected to the computing device 200 via I/O interfaces 240.

Figure 3:
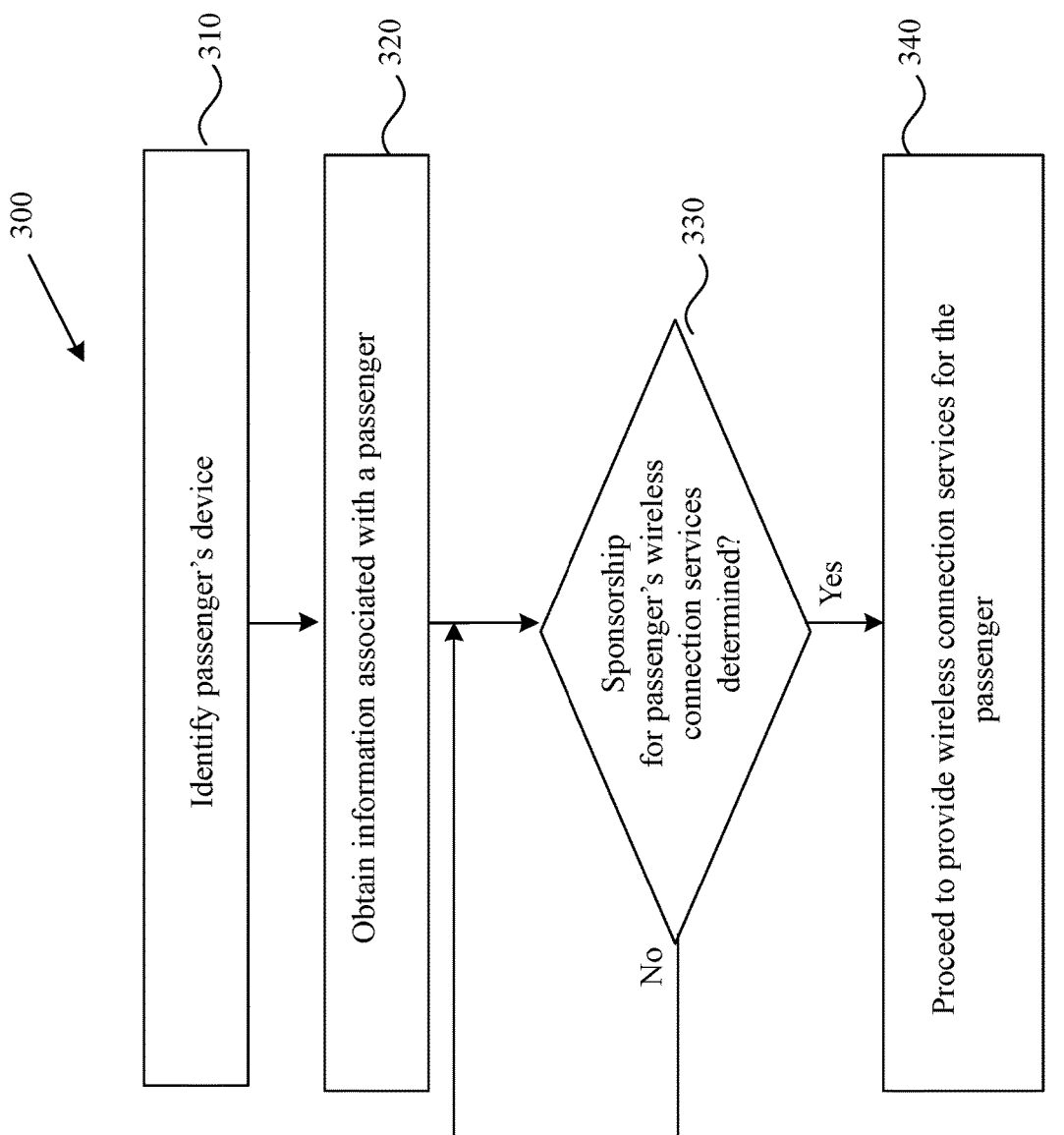
FIG. 3 shows an example flowchart of operations that are performed by a dynamic transaction allocation system (DTAS) based on some implementations of the disclosed technology.

FIG. 3 shows an example flowchart of operations that are performed by a dynamic transaction allocation system (DTAS) based on some implementations of the disclosed technology. In some implementations, the DTAS may be implemented by the server 122 as shown in FIG. 1, which is in communication with media playback devices, PEDs, a crew terminal, and one or more ground servers. In some implementation, the DTAS may be implemented as a separate onboard server from the IFE server. In some implementations, at least a part of the functions of the DTAS system may be implemented by the ground server and operate based on the communication with the ground server.

The transaction allocation process begins when DTAS identifies the passenger's mobile device at operation 310. The identifying of the passenger's mobile device may be considered as receiving a request from the passenger device for wireless connection services for a corresponding passenger. The passenger's mobile device may correspond to the PED as shown in FIG. 1. In some implementations, the DTAS may identify the passenger's mobile device automatically when the passenger's mobile device is located within a range of the on-board server communicating to a network server. For example, the passenger's personal electronic device has a software application configured to program the personal electronic device to pair with the DTAS and communicate with the DTAS to initiate the transaction allocation process.

At operation 320, the DTAS obtains information associated with a passenger. For example, the DTAS can retrieve information on the passenger including frequent flyer status of airlines, prior travel histories including travel routes, hotels, rental cars, travel patterns, connectivity history, interests, hobbies, credits associated with card companies, rental car companies, retails, rewards program and royalty status of partner companies, etc. For example, once the DTAS identifies the passenger's mobile device at the operation 310, the DTAS obtains the passenger identification information corresponding to the passenger's mobile device. With the passenger identification information, the DTAS can retrieve the passenger information from the database onboard or the ground server and/or the external servers. The obtained information associated with the passenger is then used by the DTAS to make a decision regarding an access approval and determine the appropriate class of service for the passenger. Thus, by leveraging this information, the DTAS can provide more personalized and tailored access to wireless connection services.

Based on the information obtained at operation 320, at operation 330, the DTAS determines the sponsorship for passenger's wireless connection services, i.e., the funding source who will be responsible for the costs for providing the passenger's wireless connection services. The DTAS can select a particular funding source among the numerous funding source candidates based on predetermined algorithms. The examples of funding source candidates include the following:

Airlines: By integrating with airlines' systems and assessing frequent flyer status, the DTAS can allocate internet access costs.

Frequent Flyer Miles: For example, the DTAS can use frequent flyer miles as a funding source for internet access or other services.

Hotspot 2.0: The DTAS can integrate with Hotspot 2.0 technology to identify and authenticate users, offering them convenient and secure internet access without additional payment or authentication steps.

Credit Card Companies: The DTAS collaborates with credit card companies to verify membership levels and allocate funding based on the level.

Hotels: The DTAS integrates with hotels' loyalty program and reservation systems to determine cost allocation.

Rental Car Companies: The DTAS works with rental car companies to identify membership or loyalty program status and allocate funding.

Retail Rewards Programs: The DTAS integrates with retail rewards (loyalty) programs like Target Circle, offering members the benefit of free or discounted internet access. Users enrolled in these programs can enjoy internet access benefits based on their membership status and points balance.

Other Loyalty Programs: The DTAS integrates with various industries' loyalty programs to assess user loyalty tier or points balance and determine cost allocation.

Corporate Partnerships: The DTAS identifies end-users affiliated with specific partner companies, which may cover the internet access cost.

Surveys: To offer internet access at a discounted rate or even free, the DTAS can offer the user the option to participate in surveys. The data collected could be valuable for businesses seeking consumer insights. This could be a win-win situation for the user who gets free access and the business that gets valuable data.

Digital Currency (Bitcoin): The DTAS can integrate with various cryptocurrencies, such as Bitcoin, to allow users to pay for services using these digital currencies. This feature might be appealing to tech-savvy users who prefer this mode of payment.

Advertising: The DTAS can collaborate with advertisers who will fund the users' internet access. In return, users will need to view a certain number of advertisements. This could range from watching video ads, to installing an app, or visiting a sponsor's website.

Social Media Sharing: The DTAS can offer free or discounted internet access in exchange for users posting about their experience or the venue on their social media channels. This could be a way for the service provider to gain free marketing exposure.

Affiliation Programs: The DTAS could link with various affiliation programs where users receive a discount or free internet access when they refer a friend or make a purchase through an affiliate link.

Mobile Data Trade-Off: The DTAS can work with mobile network operators where users agree to utilize their mobile data allowance for internet access in locations where it's otherwise paid.

As will be further discussed with reference to FIG. 5, the operation 330 involves communicating with various funding source candidates to determine the sponsorships for the passengers for wireless connection services. For example, if the airline (the first candidate) declines to sponsor the payment for wireless connection services, the DTAS explores options with other candidates, for example, the passenger's phone service provider or advertisers. The order that defines priorities of service provider candidates can be predetermined. The DTAS performs an authenticated communication with one or more candidates according to the order. In some implementations, the DTAS performs an authenticated communication with one or more candidates.

In some implementations, the authentication communication may be encrypted and designed specifically to securely transfer authenticated data between two parties. In some implementations, the ground server may work as the source of the user data or operate as an interface from the onboard server to other candidate servers and networks hosting the user data and authentical results. In some implementations, the authenticated communication may work with a response time budget. For example, if a desired time to fulfill a user request is five seconds, and currently there are five potential service providers to communicate with, then each service provider may be given one second to respond. If the DTAS does not hear back within one second, it will assume that the service provider is not able to meet the constraint. Therefore, the communication is performed using a time budget where a time allotted to each service provider is inversely proportional to a number of the service providers. In some implementations, the authentication communications between the onboard server and the external servers (funding source candidates) or the ground server correspond to real time communications. The onboard server includes one or more interfaces/applications to deliver optimized real-time communications to achieve desired functions.

In some implementations, the DTAS allows the passenger to make a direct payment through the mobile bill or credit card via the portal. In some implementations, the DTAS allows to determine to sponsor a portion of the wireless connection services while allowing the passenger to make the direct payment for the remaining portion of the wireless connection services. In some implementations, the DTAS requests the passenger to participate surveys or view advertisements to use the wireless connection services.

The possibilities for the DTAS in dynamically allocating funding sources are endless, facilitated by the use of APIs (Application Programming Interfaces) that enable seamless integration with various partners. With the right approach, backed by standards and supported by APIs, the number of funding source candidates and potential partners becomes limitless. While a single airline might avail itself of a limited number of sources based on factors such as cross-marketing agreements, regional preferences, or cultural needs, the DTAS opens the door for service providers to access thousands of options. This benefits all parties involved, including the service provider, the customer (airline), the end user (passenger), and the partners (retailers). Through these transactions, retailers can display hyper-targeted marketing messages to end users, creating a win-win scenario for everyone involved, and the comprehensive approach ensures uninterrupted connectivity and enhances the inflight internet experience for passengers. The actual implementation and availability of funding sources depend on the agreements and integrations established between our organization and each industry's stakeholders.

After the sponsorship for wireless connection services for a passenger is determined, at operation 340, the DTAS provides the wireless connection services to the passenger by establishing data connectivity for the passenger device based on the determination. For example, the DTAS authorizes and authenticates the wireless connection services for the passenger after the approval from the corresponding service provider. The authorization and authentication to establish the wireless connection services for the passenger device may be performed in various manners, which include, for example, exchanging security information between the DTAS and the ground server or external servers.

The DTAS is transformative in the realm of internet access by automating the decision-making process and dynamically assigning the most suitable payment options to users. By considering various factors and utilizing a diverse range of payment sources, the system ensures a seamless and optimized experience for users and service providers. In one aspect. DTAS is a dynamic internet access platform that through algorithms selects the optimal means of access, quality of experience, service offering and payment for airline and passenger.

The operations as shown in FIG. 3 can automatically proceed when, for example, passengers' devices connect to onboard wireless connection services after boarding an airplane. As the passengers' devices are located onboard, for example, within a certain range from the IFE server, the DTAS obtains passenger information and determine access and service based on passenger profiles. Then, the DTAS provides wireless connection services for passengers without requiring passengers' intervention or involvement in the process. The DTAS leverages information from the passenger's device, collaborates with phone service providers and advertisers, and provides direct payment options to deliver an enhanced inflight internet experience.

Figure 4:
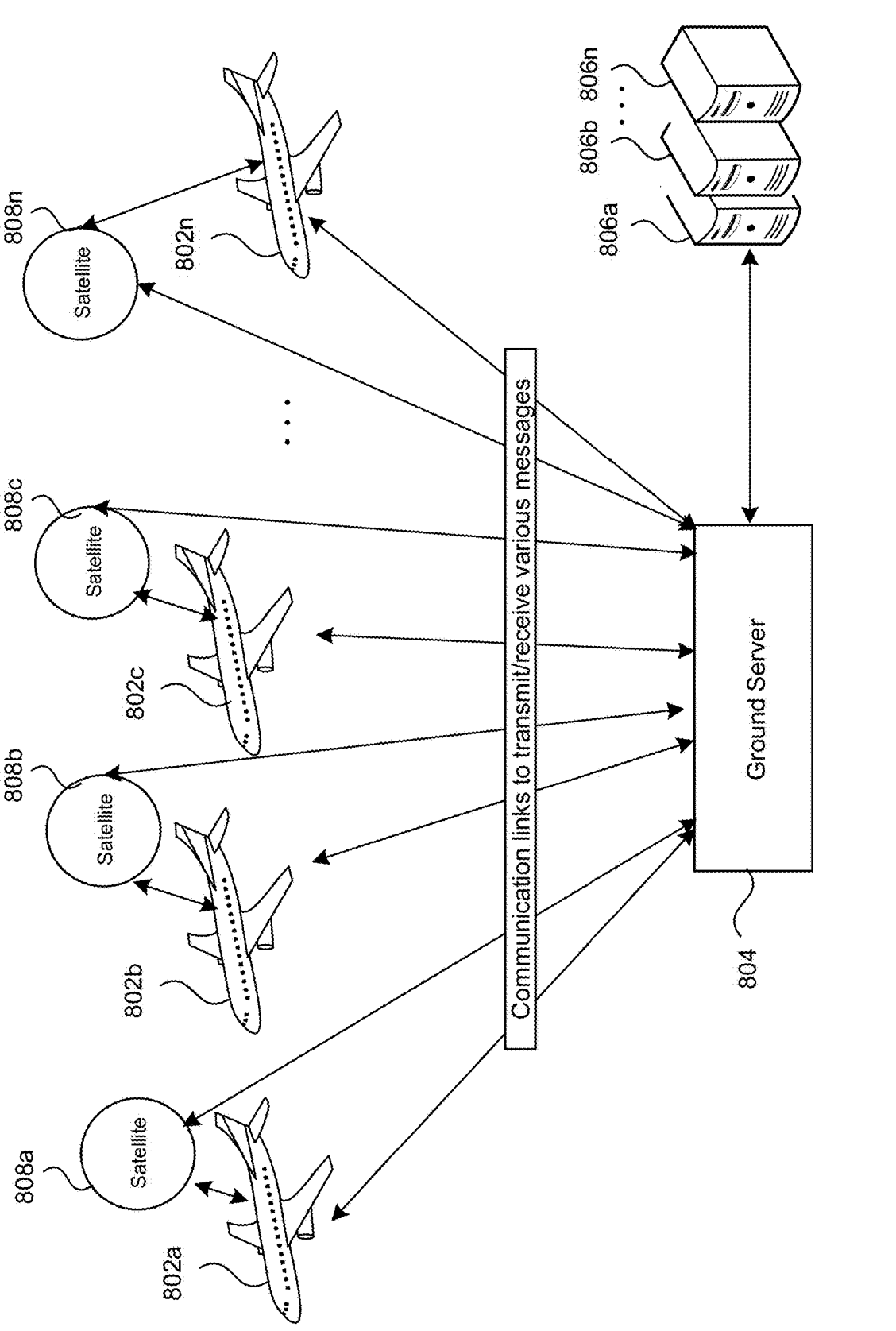
FIG. 4 shows an example of a configuration of data and information exchange for assisting a DTAS based on some implementations of the disclosed technology.

FIG. 4 shows an example of a configuration of data and information exchange for assisting a DTAS based on some implementations of the disclosed technology. In the example of FIG. 4, the ground server 804 is located on the ground and communicates with airplanes 802a to 802n, satellites 808a to 808n, and external servers 806a to 806n. Each of the plurality of airplanes 802a to 802n includes an IFE system. The IFE systems of the airplanes 802a to 802n, the ground server, and the external server 806a to 806n can communicate to exchange data and information to assist the operations/functions of the DTAS. For example, the DTAS can obtain from the ground server 114 information about passengers and utilize the passenger information to determine sponsorships for wireless connection services for passengers. In some implementations, the ground server 804 works as the source of the user data or operate as an interface to other servers and networks hosting the user data and authentical results. For example, the onboard server can obtain from the ground server 804 information about passengers and stores the obtained passenger information in the database. For example, when the airplane is waiting at an airport to board passengers or while the passengers are boarding the airplane, the onboard server can obtain from the ground server 804 information about passengers that are located in or are expected to board the airplane.

The external server 806a to 806n may correspond to servers corresponding to different funding sources entities, e.g., airlines, credit card companies, hotels, rental car companies, retails, partner corporates, advertisers, social medias, affiliations, etc. The IFE systems of the airplanes 802a to 802n can communicate directly with the external servers 806a to 806n or indirectly with the external servers 806a to 806n via the ground server 804. In each airplane, an onboard server can communicate with the ground server 804 and the external server 806a to 806n via an antenna directly or through satellites 808a to 808n. Although the ground server 804 is shown in FIG. 4 as being located on the ground, the ground server 804 can be located in the cloud or at a remote location. The external servers 806a to 806n may be located outside of the airplanes and communicate with the ground terminal over the Internet or wired or wireless networks using a variety of communication protocols.

Although now shown in the drawing, the implementations of the disclosed technology implement the following functions:

Multi-Orbit setup (Wi-Fi Service Layer): LEO (low earth orbit) or GEO (geostationary earth orbit) or MEO (medium earth orbit) coverage based on type of passenger requested service (live TV, live sport, movie download location) from an airline app during a particular leg of a flight and the location/timing of requested service is provided from, and passenger/service provider/mobile operator preferences. In some implementations, the DTAS establishes wireless connection services across multiple heterogenous networks including LEO, GEO, and/or MEO, each having a respective authentication, authorization and accounting (AAA) function.

Mediation arbitration engine (Wi-Fi Service Layer): At the headend/remote terminal, passenger's preferences are analyzed on selected flight(s) in real-time and updates sponsorship. Wi-Fi country, mobile operator for Wi-Fi service of one or more passengers on a leg of a particular flight/portion of the flight on a pro-rated basis in accordance with passenger's desired product(s)/service(s) selection. In some implementations, the mediation arbitration engine may be implemented as a part of the DTAS.

Sponsorship engine (Wi-Fi Service Layer): The sponsorship engine may communicate with advertiser, mobile operator, etc. Wi-Fi country and mobile operator provide airline rules and Wi-Fi Service Layer settings (LEO, GEO, MEO) when and what and which passenger(s) usage constitutes a level of payment for each passenger usage request or desired. These may be called connectivity service providers. In some implementations, the sponsorship engine is implemented as a part of the DTAS or implemented separately from the DTAS. When the sponsorship engine is implemented separately from the DTAS, the DTAS has a function to communicate with the sponsorship engine and provide data connectivity services to passengers based on the communications with the sponsorship engine.

Figure 5:
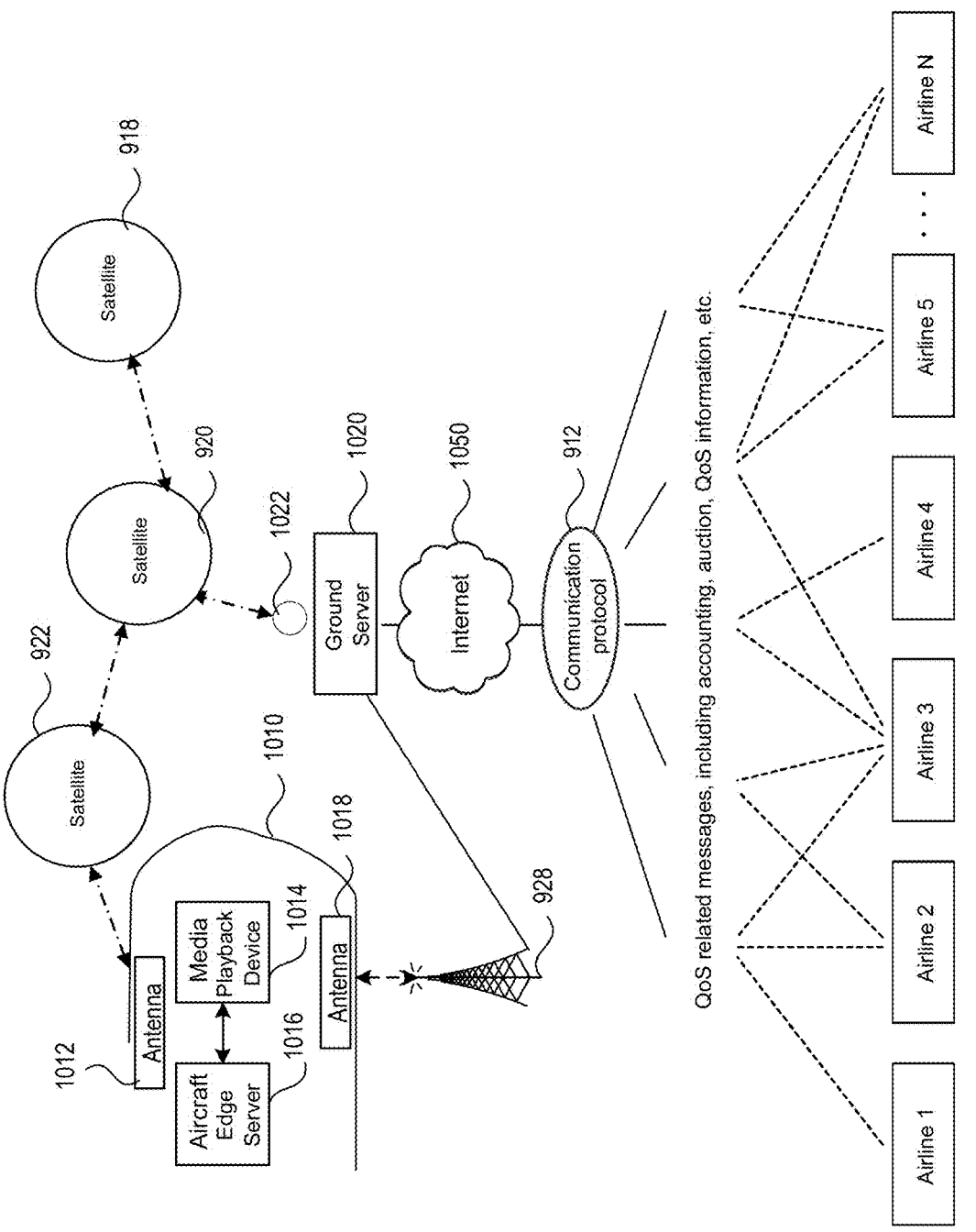
FIG. 5 shows an example of a configuration of a DTAS for allocating transaction based on some implementations of the disclosed technology.

FIG. 5 shows an example of a configuration of a DTAS for allocating transaction based on some implementations of the disclosed technology. In the example of FIG. 5, some elements of the airplane 1010 are shown, which include antennas 1012 and 1018, a media playback device 1014, and a server 1016. The media playback device 1014 is in communication with a server 1016 and the airplane 1010 is in communication with a ground server 1020 through an antenna 1012 (on airplane 1010) via one or more satellites 918, 920, 922 and/or a terrestrial communication station 928.

The antenna 1012 maybe sized and shaped to fit within the space specified by the relevant standard. For communication with geostationary satellites and providing a satisfactory communication experience for passengers on the airplane, the antenna needs to satisfy certain characters related to antenna performance. For example, G/T is a factor typically used for characterizing antenna performance, where G is the antenna gain in decibels in a receive frequency band, and T is the equivalent noise temperature in Kelvins. For example, the antenna 1012 may be configured to provide a certain range of G/T depending on area features during a travel of the airplane 1010. The G/T values are simply provided as examples and are not to be construed as limiting the various adaptive aspects described herein.

For the communications between the ground server 1020 and the airplane 1010, a ground server antenna 1022 is further provided. The ground server 1020 can retrieve data from the airplane 1010 using communication links through the antenna 1012, one or more satellites 918, 920, 922, the ground server antenna 1022, and/or the terrestrial communication station 928. In some implementations, the ground server 1020 can be communicably coupled to the Internet 1050 to retrieve processed data. The Internet 1050 is an example only and other communication protocols can be used to enable the communications between the ground server 1020 and additional servers/platforms.

As shown in FIG. 5, ground server 1020 can be further in communication with various servers/platforms to obtain various network/operational data, for example, quality of service (QoS) related message including accounting information, auction information, QoS related information, or others. Although the QoS related information is shown in FIG. 5, the QoS is the example of service quality related information. In the implementations, various service quality related information may be utilized without being limited to the QoS related information. The various data can be obtained from various platforms/sources, including multiple airlines, Airlines 1 to N. Although not shown, the machine learning/artificial intelligence module can be employed to cooperate with the ground server 1020 to provide the network/operational data obtained from various servers/platforms. The various servers/platforms can operate as sources of various data that is related to a travel by a commercial passenger vehicle and provide any related information to the ground server 1020 (and/or the machine learning/artificial intelligence module). Such data can be utilized by the ground server 1020 (and/or the machine learning/artificial intelligence module) and communicated with the aircraft edge server 1016 to perform the dynamic transaction allocation.

Figure 6:
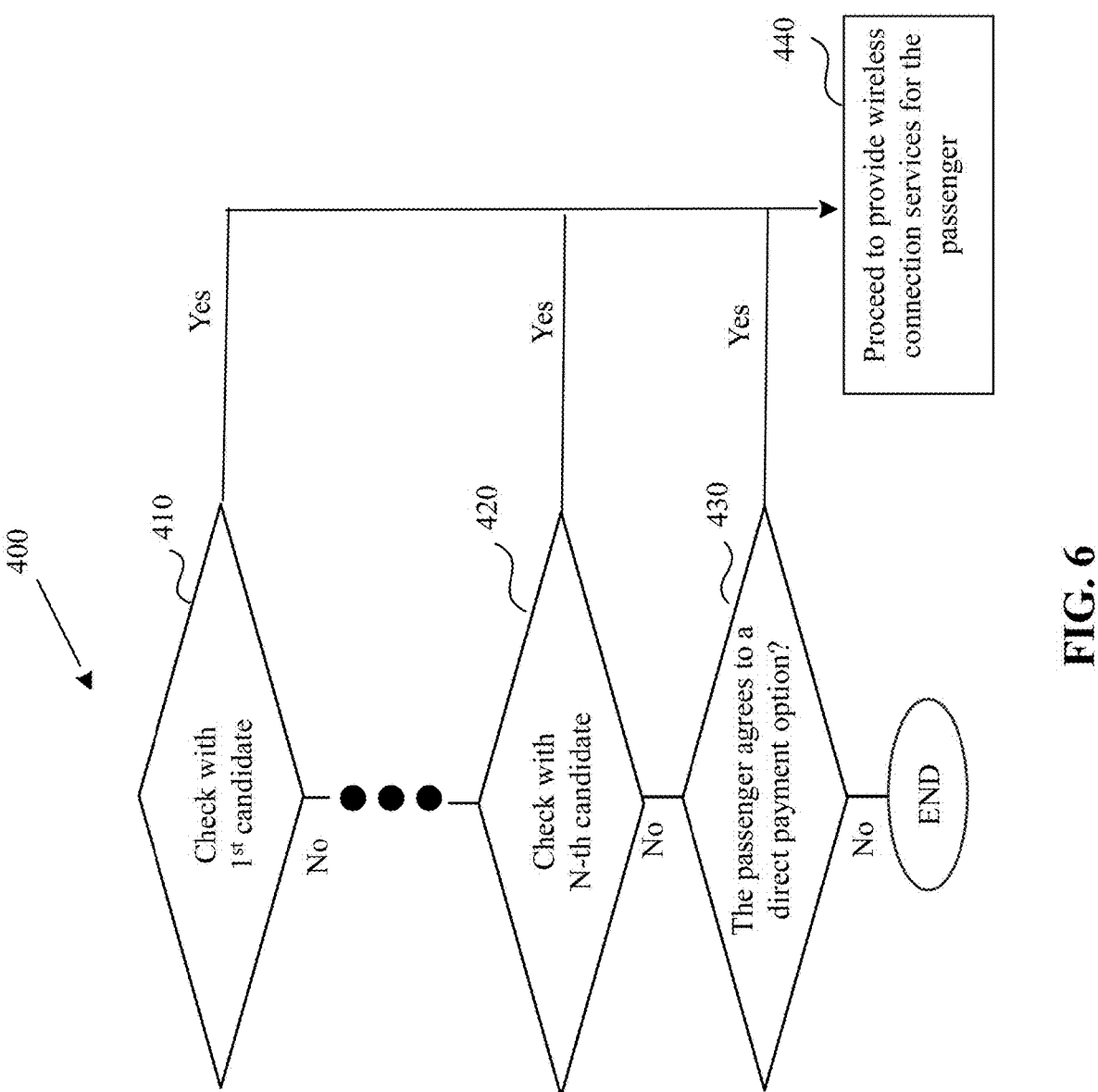
FIG. 6 shows an example of the determination process by a DTAS based on some implementations of the disclosed technology.

FIG. 6 shows an example of the determination process by the DTAS based on some implementations of the disclosed technology. The determination process 400 as shown in FIG. 6 is the example of the operation 330 as shown in FIG. 3. The determination process 400 can proceed based on a predetermined algorithm to identify a best matching sponsorship among various funding sources for providing the wireless connection services for the passenger. The predetermined algorithm can be stored in the DTAS and applied to make the determination of the sponsorship for passengers during the flight. A range of diverse elements can potentially play a role in algorithms for the determination process for wireless service allocation, amongst which include:

Frequent Flyer Status: The allocation process could be influenced by a user's frequent flyer status. For instance, a Diamond-tier flyer might receive complimentary or heavily discounted access, while a Lead-tier flyer or a non-member might have different offers.

Travel Purpose: The reason behind a user's travel could also potentially impact the service. Business travelers, for instance, might need more reliable, high-speed internet for their work, hence they might be more inclined to pay more or have their business cover the cost.

Flight Duration: The length of a flight might bring more value for Wi-Fi access as compared to short-haul flights. Therefore, the pricing or allocation strategy might vary based on the flight's duration.

User Demographics: Considerations such as age, occupation, or income level might inform decision-making. For example, discounted rates could be offered to students, while professionals might be catered to with higher-tier paid access.

Device Type: The device type used to connect to the Wi-Fi could also be a determinant. Users connecting with multiple or high-end devices might be offered distinct plans or payment options compared to those connecting with a single, less advanced device.

Connectivity History: The frequency and extent of a user's Wi-Fi access purchase or their bandwidth usage during their sessions could inform the most suitable payment options for future access.

Class of Service: Differences in service class, such as first-class passenger versus coach passenger, could impact the provision and pricing of the Wi-Fi service.

Type of Flight: The flight type, be it a regional jet or a long-haul flight, could influence the Wi-Fi service offering and its allocation process.

Type of Airline: The kind of airline, whether it's a low-cost carrier or a full-service carrier, may also influence the decision.

Time of Day: The time of the flight, whether it's a daytime or a red-eye flight, may impact the Wi-Fi service and its usage.

Flight Route: The route of the flight (for instance, LAX to SFO vs. LAX to RNO) could potentially affect the Wi-Fi service.

Multi-Orbit Setup (Wi-Fi Service Layer): LEO or GEO or MEO coverage based on type of passenger requested service (live TV, live sport, movie download location) from an airline app during a particular leg of a flight and the location/timing of requested service is provided from, and passenger/service provider/mobile operator preferences.

Mediation Arbitration engine (Wi-Fi Service Layer): At the headend/remote terminal, passenger's preferences are analyzed on selected flight(s) in real-time and updates sponsorship, Wi-Fi country, mobile operator for Wi-Fi service of one or more passengers on a leg of a particular flight/portion of the flight on a pro-rated basis in accordance with passenger's desired product (s)/service(s) selection.

Sponsorship Engine (Wi-Fi Service Layer): Advertiser, mobile operator, Wi-Fi country provide airline rules and Wi-Fi Service Layer settings (LEO, GEO, MEO) when and what and which passenger(s) usage constitutes a level of payment for each passenger usage request or desired.

The DTAS determines the sponsorship for the passenger's wireless connection services based on a predetermined algorithm. In some implementations, the algorithm identifies available funding source candidates and defines an order of priorities of various funding source candidates for providing the wires connection services for the passenger. For example, by initiating the communication with the passenger's device with the DTAS through the airline's dedicated app, the algorithm defines the first candidate (e.g., the airline) to be considered. Thus, at operation 410, the DTAS checks with the airline whether the airline agrees to cover the cost of wireless connection services for the passenger by performing an authenticated communication with the airline. If the airline agrees to cover the cost, the DTAS proceeds to provide the wireless connection services for the passenger by establishing data connectivity for the passenger device while allocating the costs to the airline. If the airline declines to cover the cost of internet access for the passenger, the DTAS checks with a second candidate according to the predetermined order by performing an authenticated communication with the second candidate. For example, the system performs the authenticated communication with the passenger's phone service provider to check if their service plan includes in-flight wireless connection roaming services. By leveraging the existing agreement with the phone carrier, the DTAS determines whether the passenger is eligible for access and the corresponding class of service. In these instances, the payment for the wireless connection session is made by the phone company, ensuring that the passenger can enjoy connectivity throughout the journey. If the phone service provider also declines to cover the cost, the DTAS checks with a third candidate according to the predetermined order by performing an authenticated communication with the third candidate. This process can be repeated until the DTAS identifies the funding source for the wireless connection services for the passenger.

In some implementations, different algorithms may be applied to different passengers based on the information associated with the different passengers. In some implementations, the DTAS explores the possibility of sponsorship from advertisers who are interested in funding the passenger's wireless connection session. This could involve displaying targeted advertisements to the passenger during the session in exchange for free or discounted access. Advertisers might choose to present destination-specific offers or promotions, creating a win-win situation where passengers gain access while advertisers gain exposure. The information obtained at operation 320 may be utilized to display targeted advertisement to the passenger. For example, when the DTAS learns the passenger has a hobby of travels, the DTAS can select advertisements related to the travels for the display. By displaying the event that is pertinent to the passenger's interests, the passenger can be more interested with the display of the advertisements and can lead the passenger to purchase items displayed by the advertisement, which provide more business opportunities.

In some implementations, if no sponsorship opportunities are available ("No" at operation 420), the final layer of the system offers the passenger a direct payment option at operation 430. Thus, the passenger can pay for the wireless connection session using their mobile billing service. If the passenger does not agree to the direct payment option, the process 400 ends and the passenger may be not able to use the wireless connection services. In some implementations, the algorithm can provide a discounts for the direct payment option while asking the passenger to take a survey or watch some advertisements. In some implementations, the algorithm can allow the passenger who agrees to proceed with the direct payment option to make the payment with the currency the passenger prefers, which includes the digital currencies such as cryptocurrencies.

As discussed above, according to the implementation, there are multi-layered candidates from the first candidate to the N-th candidate, which are considered as the funding source candidates for wireless connection services of the passenger. This multi-layered decision techniques may be referred to as the multi-layered approach. In the example, the first layer involves the communication between the passenger device and the airline's dedicated app, the second layer involves checking the sponsorship with a first candidate according to the predetermined order, the third layer involves checking the sponsorship with other candidates according to the predetermined order, and the final layer involves offering the passenger a direct payment option.

Thus, the first, second, and the third layers of the DTAS can proceed each step without passenger's inputs, while the final layer involves getting the passenger's input regarding whether the passenger agrees to proceed with the direct payment option. The implementation of the disclose technology provides a seamless and hassle-free passenger experience using a multi-layered approach. By employing this multi-layered approach, the IFE system ensures seamless connectivity for passengers without requiring their intervention or involvement in the payment process.

The following hypothetical scenarios are provided as examples of the dynamic transaction allocation for three passengers on an airline:

Passenger 1 (P1): Assume that P1 is a top-tier frequent flier. As P1 boards the aircraft, P1's mobile phone associates with the airline's wireless access point (WAP), which communicates with the airline's app. The airline recognizes P1's frequent flyer number and immediately provides free internet access for their entire journey. The portal simply thanks P1 for their loyalty and reminds them that their internet service will be free of charge.

Passenger 2 (P2): P2 is a lower-tier frequent flier. As P2 boards the aircraft, P2's mobile phone associates with the WAP, which communicates with the airline's app. The airline recognizes P2's frequent flyer number but, due to their lower status, does not provide them with free internet access. Instead, the request is transferred to a partner wireless service provider (for example, Verizon Wireless). The wireless service provider quickly verifies that P2's "Unlimited+" plan includes ten in-flight internet sessions per month. If this is P2's 11th session request, they are offered an option to upgrade to "Unlimited++" or use additional options such as paying with frequent flier points, a credit card, or an advertisement-supported tier.

Passenger 3 (P3): P3 is an infrequent flier. P3's mobile phone does not associate with the WAP as the SSID is unknown to the device, and P3 doesn't have the airline's app. Once P3 joins the WAP, P3's "unknown" status leads to being offered the option to pay the full price for the service or receive a 50% discount by watching a targeted advertisement. Alternatively, P3 can pay using other currency (such as Bitcoin), and P3 may even have the option to get a 100% discount by completing a quick 10-question (e.g., Nielsen®) survey about rental car vendor preferences and reasoning.

Thee above scenarios show examples how the DTAS dynamically allocates funding sources and payment options based on different factors, providing a personalized and efficient experience for users. All these factors may be leveraged in accordance with local laws and privacy policies, safeguarding users' rights and data.

In some implementations, the default algorithm for determining the sponsorships is prestored and applied to determine the sponsorship of each passenger in the airplane. In some implementations, the passenger can provide feedback and the DTAS can modify the algorithm applied for the decision of the sponsorship based on the feedback. In some implementations, the DTAS runs a machine learning algorithm that is designed to evaluate feedback data and determine to modify the algorithm by, for example, changing priorities to certain factors of the decision elements. For example, if a passenger has a need for more reliable, high-speed connection services despite costs, the passenger can provide an input to modify the default algorithm so that he or she can use the wireless connection services as he or she prefers. Such modification can be made through various manners, for example, the airline's dedicated app. Thus, the airline's dedicated app is designed to be capable of receiving the modification request and modify the default algorithm based on the modification request from the passenger.

In some implementations, the transaction allocation techniques not only focus on cost control but also consider the quality of the services provided to the passengers. Thus, in some implementations, the DTAS determines the funding source that satisfies the predetermined conditions related to the quality of service. In this case, the data connectivity is established for the passenger device when the decision process identifies the sponsor who approves the cost for providing wireless connection services for the passenger device and is also able to meet the predetermined service quality measurements. For example, the DTAS proceeds the determination process 400 for allocating the transactions in consideration of the service quality information. The service quality information may include quality of service (QoS) information, quality of experience (QoE) information, and any other measurements related to the service quality. For example, the determination process for determining the sponsorship can proceed to optimize the service quality performance of wireless connection services provided to passengers. For example, the DTAS stores predetermined conditions related to the quality of service and/or quality of experience and calculates parameters to satisfy the predetermined conditions. In some implementation, the predetermined conditions may be set to specify certain ranges of values of reliability, delay or latency, jitter, bandwidth, or others, which can affect the performance of wireless connection services.

In some implementations, the transaction allocation techniques consider various factors that can influence the service quality information, for example, QoE, such as the passenger's frequent flyer status, travel purpose, flight duration, demographics, device type, and others. For example, business travelers requiring reliable and high-speed internet for work-related tasks can be allocated a higher QoS level, while leisure travelers might have different QoS options that align with their needs and preferences. By tailoring the QoS based on individual characteristics and preferences, the transaction allocation techniques can deliver a personalized and satisfying internet experience to passengers. Thus, it is possible to improve their overall satisfaction and also create a competitive advantage for airlines and service providers in the IFC market. In some implementations, the flexibility of the transaction allocation techniques allows airlines and telecommunication companies to adjust and refine QoS parameters based on customer feedback, market trends, and technological advancements. This iterative approach ensures continuous improvement of QoE and adaptability to changing passenger expectations. The QoS and QoE are examples of the service quality information only and other service quality related indicators can be utilized by the determination process 400. In some implementations, only one service quality information (for example, QoS) can be considered in the determination process 400. In some implementations, at least two different service quality information (for example, QoS and QoE) can be considered in the determination process 400. By leveraging the decision engine, the transaction allocation techniques can dynamically allocate the transaction to an appropriate funding source and/or one or more orbital or satellite class of services to satisfy the desired quality of services based on the information collected from the potential funding sources and the passenger's profile. This ensures that passengers receive optimal internet access performance and seamless connectivity throughout their journey.

Figure 7:
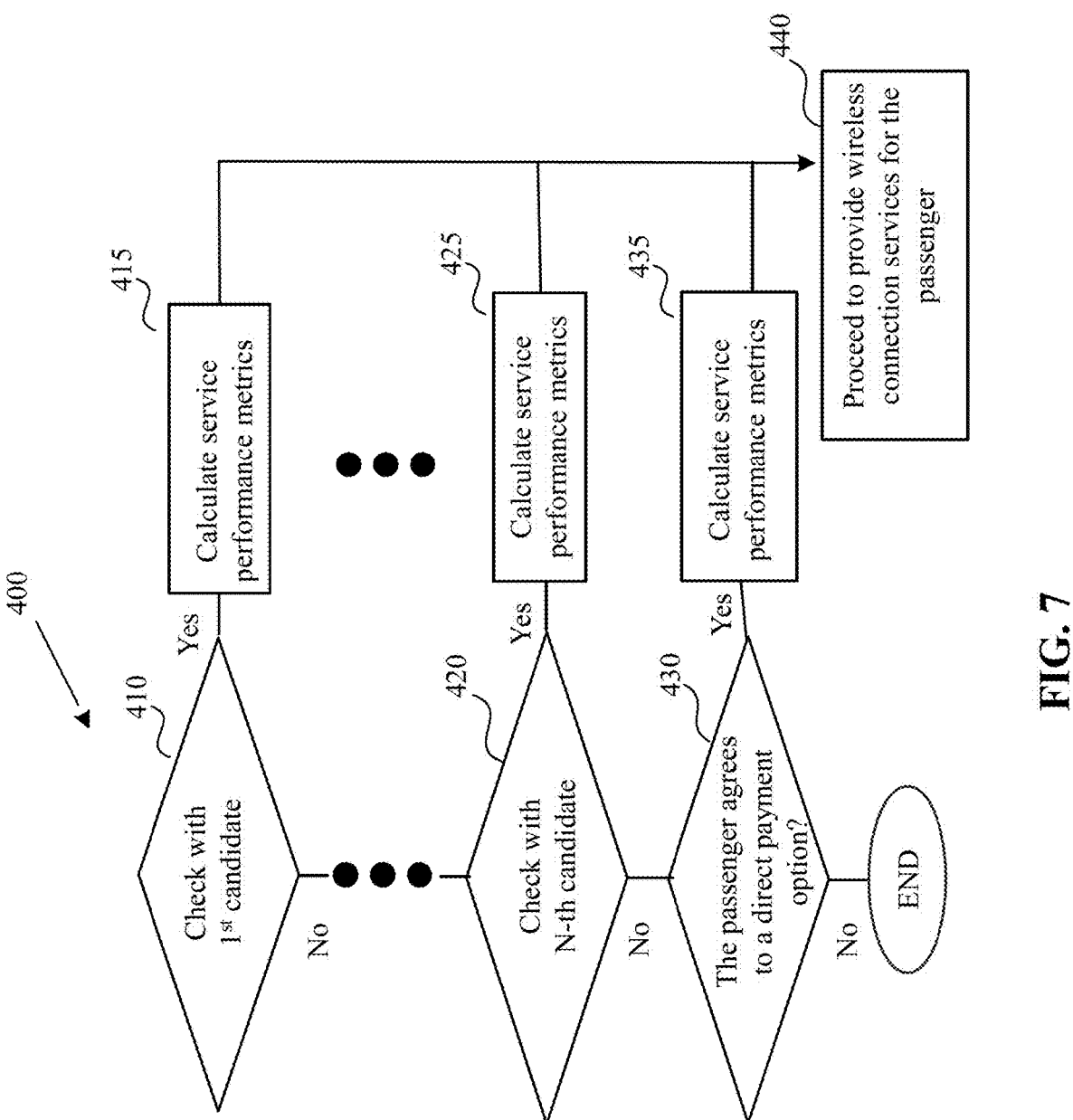
FIG. 7 shows another example of the determination process by a DTAS based on some implementations of the disclosed technology.

FIG. 7 shows an example flowchart of operations that are performed by DTAS based on some implementations of the disclosed technology. As discussed above, the DTAS may be implemented as a function of the IFE server or as a separate server from the IFE server. The operations 410, 420, 430 are similar to the operations as shown in FIG. 6. In this implementation, the DTAS calculates the service performance metrics at operations 415, 425, and 435. For example, the DTAS calculates a network quality of service matric that optimizes Quality of Service (QoS) and/or Quality of Experience (QoE) for each passenger device based on a corresponding sponsor for providing payment for the wireless connection services and/or network infrastructure including one or more orbital or satellite networks.

The airplane may be in communication with both a Low Earth Orbit (LEO) satellite and a Geostationary Earth Orbit (GEO) satellite for providing wireless data services. Types of the wireless data services that can be provided to the airplane are based on a terminal capability, e.g., whether the airplane has a dual channel transceiver or not. In some implementations, the airplane may have a single channel transceiver and thus can receive signals from the LEO or the GEO but not simultaneously. In some implementations, the airplane has a dual channel transceiver and thus can receive the signals from the LEO and the GEO simultaneously. The service performance metrics are calculated based on the terminal capability, the satellite connections, air-to-ground connections, onboard wireless connection installment, etc. At operation 440, the DTAS provides the wireless connection services for the passenger by establishing data connectivity based on the calculated service performance metrics.

The implementations of the disclosed technology not only streamline payment allocation but also prioritize the service quality information, enabling airlines and service providers to deliver an outstanding internet experience to passengers while maintaining cost control and revenue optimization. In some implementations, in the case where the system has multiple WANs (e.g., LEO and GEO) operating simultaneously (via a dual beam antenna, etc.), the DTAS may further offer particular end-users satisfying certain conditions an access to the premium wireless connection services with higher speed, lower latency, etc. The premium connection network may be implemented at the WAN level. In some implementations, the certain conditions for the access to the premium wireless connection services may be predetermined based on various factors including their frequent flyer status, a seat type, an agreement to pay more for the premium network, etc. The DTAS offers substantial benefits to users and service providers. For users, it simplifies Wi-Fi access and provides seamless connections, ensuring an excellent user experience. For service providers, it optimizes revenue generation and cost coverage, allowing providers to implement pricing strategies, promotions, and partnerships that align with their business goals while maximizing user satisfaction. For airlines, the DTAS allows the opportunity to personalize services to a certain QoS or QoE level.

Figure 8:
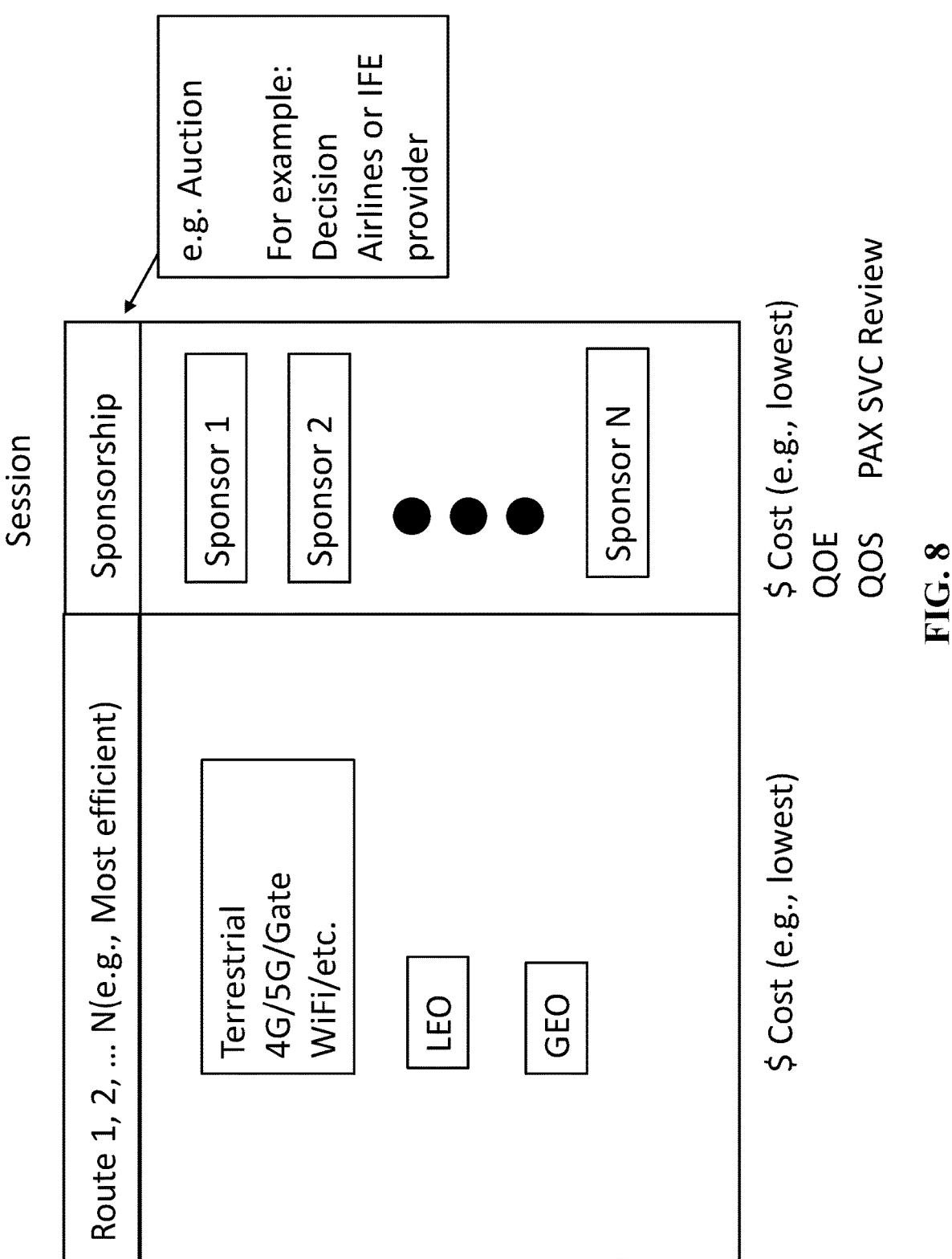
FIG. 8 shows an example diagram that illustrates a decision process by the DTAS for providing data connectivity to passenger devices based on some implementations of the disclosed technology.

FIG. 8 shows an example diagram that illustrates a decision process by the DTAS for providing data connectivity to passenger devices based on some implementations of the disclosed technology. In some implementations, the DTAS's decision process proceeds based on at least two different layers of the networking model that defines the communication hierarchy expressed with seven different layers. For example, the seven layers of the Open Systems Interconnect (OSI) model is known in the art, which includes a layer 1 (physical layer), layer 2 (data link layer), layer 3 (network layer), layer 4 (transport layer), layer 5 (session layer), layer 6 (presentation layer), and layer 7 (application layer). The lower layers are hardware-based, and the higher layers are more software-based.

In the example shown in FIG. 8, a left-side of the decision includes a selection of a layer 1 (physical layer) connectivity option. For example, a selection may be made about whether to use a terrestrial connection, a 4G connection, a 5G connection, a Wi-Fi access point at a gate at which the airplane may be parked, a LEO satellite connection, a GEO satellite connection, and so on. On the right-hand side, the decision includes consideration about layer 3 (network layer). This may include, for example, layer 3 issues such as who will sponsor the connectivity at a specified QoS or QoE level. For the decision process, in this example, cost estimates may be used and/or user feedbacks about what service the user would like to select may be obtained, including based on cost. Thus, in some implementations, the data connectivity is established for the passenger device when the decision process identifies the sponsor who approves the cost for providing wireless connection services for the passenger device and is able to meet the predetermined service quality measurements. In some implementations, the DTAS is configured to run a machine learning algorithm that is designed to evaluate the user feedbacks and determine a revised service provider for the passenger device. A data connectivity session may be established for a passenger device based on the determination.

In some implementations, the sponsorship can be determined based on an auction. In this case, the algorithm for the determining the sponsorship can integrate logic functions to automatically provide real-time support to candidates in an auction. For example, the logic functions integrated to implement the auction may include identifying a particular passenger for whom the sponsorship for providing data connectivity is auctioned, communicating the information associated with the particular passenger to candidate sponsors, automatically prompting each of candidate sponsors to make a bid for providing data connectivity for the particular passenger, selecting at least one candidate among the candidate sponsors to provide data connectivity for the particular passengers. The auction process can be modified in various manners, for example, prompting a candidate sponsor to update the bid when there is a bid from other candidate sponsors; updating information on the particular passenger when there is any change, and others.

In some embodiments, a multi-tier architecture may be used for a dynamic transaction allocation system. A four tier 'decision engine' on cost control and QoS policies is discussed as a representative example. The messages exchanged in such framework are designed to provide seamless authentication and a decision engine that processes information from multiple potential payers to determine who pays and what QoS is provided to the passenger. This all may happen without any intervention from the passenger and in a matter of a couple of seconds.

The first stage is that the passenger's mobile device connects to the onboard Wi-Fi network. The Wi-Fi is the example of wireless connection services and other example is also available. The first 'layer' after this is to talk to the airline app on the passenger's device and read enough information from what's stored on there, e.g. boarding pass, seat number, frequent flyer status, ticket information etc., to be able to either make a decision inside a back-office systems as to whether the passenger is approved for access, and what class of service needs to be offered. Alternatively, or in addition, that information is sent to the airline's back-office systems and airlines instructs the connectivity system to either let the passenger in or not. Class of service could not only include the traditional QoS parameters, but in a multi-orbit, multi-beam (M-O, M-B) system, the orbital class of service. The airline may pay the connectivity provider to carry the traffic.

If the airline declines to pay for the service, the passenger's device and get their phone service providers information may be queried. Messages may be exchanged with the phone service provider to determine whether the passenger's service plan includes Wi-Fi roaming inflight. The phone carrier will inform about whether the connectivity system is allowed to enable a session, what class of service and then the connectivity system lets the passenger connect if they are approved. The phone company may pay the connectivity system for the service.

If the phone company declines to pay for the session, then a sponsorship engine may be queried to see if there are advertisers who are interested in paying for the passenger's session. An example might be a passenger flying from Chicago to London is shown an advertisement from the London Tourist board, or some other destination specific advertiser and then the passenger is given access at a specific service level, perhaps only browsing.

If no one wants to advertise to the passenger, they then get a text asking them whether they want to pay for a session on their mobile bill and they can simply reply to that text confirming they want to buy a session and they are then granted access.

The 'rules' can be adjusted by the airlines (and telcos) to create the session experience they want to offer individual passengers, or classes of passengers. This allows the airlines (and telcos) to manage the costs and experience they want to offer the passengers.

In some embodiments, in addition, or alternatively to, an auction system as discussed with reference to FIG. 8 may be used where different parties may be sent an electronic message that invites them to an auction for the opportunity to provide connectivity to the passenger.

Based on the implementations, the DTAS expedites user network access, reducing manual interactions, while enabling service providers to make intelligent, real-time decisions about cost coverage. For example, using the DTAS, a premium tier airlines passenger may be able to use LEO while another (non-premium tier) passenger may be able to use GEO satellite connectivity. DTAS is an advanced solution automating the decision-making process for determining the best payment option for internet access or other services and personalization of services to individual passengers. Unlike current methodologies, DTAS operates nonlinearly, considering various factors and using logic to identify suitable payment options. In some implementations, DTAS uses portal technology to authenticate users and control network access. On user connection to a public network, they are redirected to a portal page that serves as the DTAS system's entry point. DTAS can be designed to have the optional ability to factor in user location, device type, network usage patterns, payment preferences, alternate payment options (e.g. mobile subscriptions), and existing promotions or partnerships to determine the optimal payment option(s). This is done in real-time, using a set of rules and algorithms. DTAS accommodates various payment sources, including loyalty points, credit or debit cards, mobile payment platforms, prepaid vouchers or cards (e.g., SIM card based mobile subscriptions), sponsored access, and innovative models like cryptocurrency. Each source's eligibility is evaluated based on supplier and user preferences, payment security, transaction costs, compatibility with the provider's infrastructure, or provider's business model. After determining the best payment option, DTAS presents it to the user via the portal page. The user is given clear, concise information about the payment method and associated terms and conditions and guided through the secure payment process, requiring minimal user interaction. In some cases, the portal could be automatically bypassed, such as when a device is pre-authorized or employs specific technology such as Hotspot 2.0.

Figure 9:
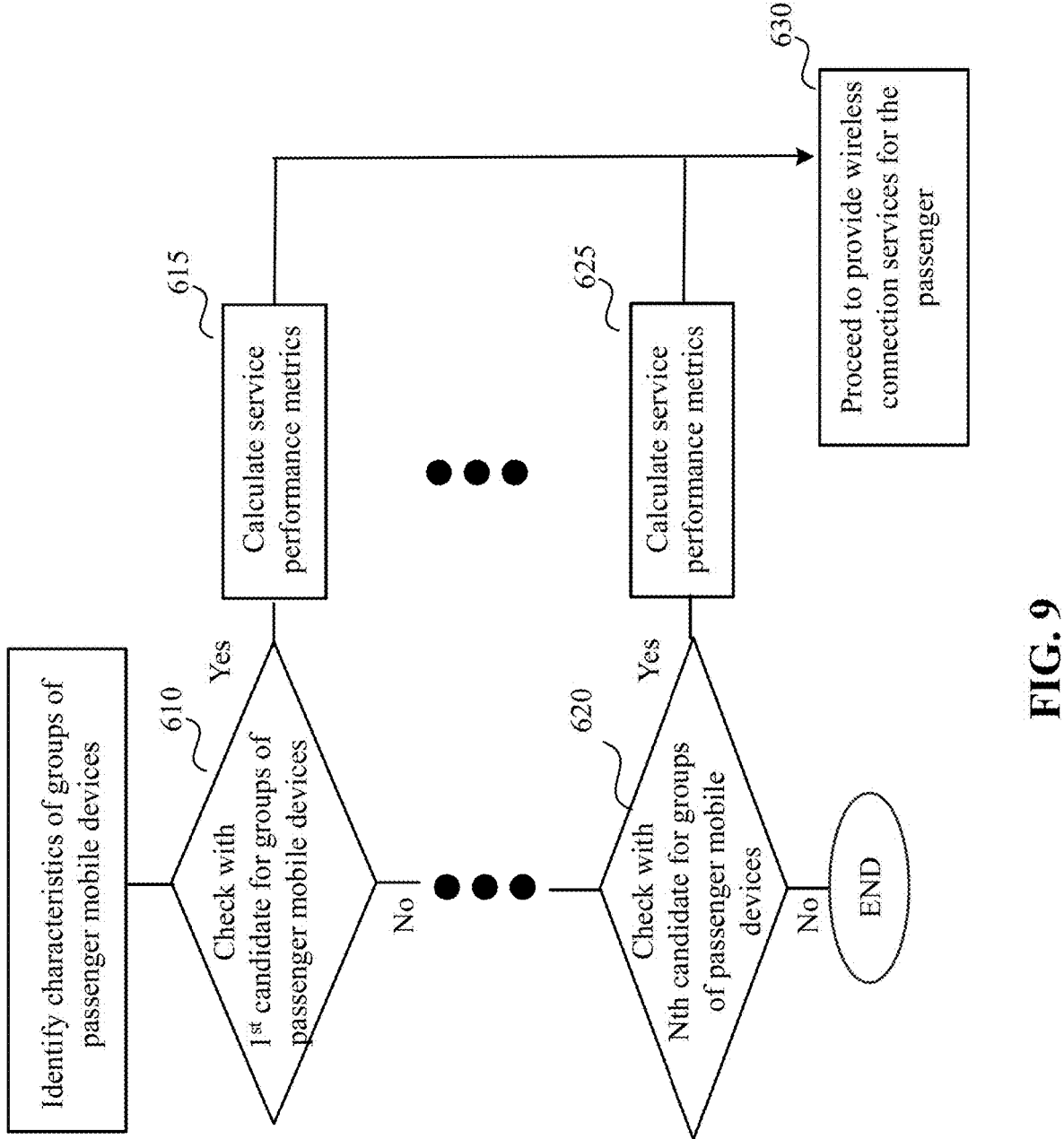
FIG. 9 shows an example flowchart of operations that are performed by a DTAS for groups of passenger devices based on some implementations of the disclosed technology.

FIG. 9 shows an example flowchart of operations that are performed by a dynamic transaction allocation system (DTAS) based on some implementations of the disclosed technology. Unlike the example as shown in FIG. 3, the example as shown in FIG. 9 shows operations performed for each group of passenger devices that are formed based on a predetermined rule. The predetermine rule may consider various factors to form groups of passenger devices, which include a class or a level of a quality of service, a class or a level of a quality of experience, a class or a level of other service quality performances, sponsors, travel routes, seat types, frequent flyer status, ticket information, etc. For example, the DTAS obtains various passenger information from a local storage, or a remote storage and the passengers can be grouped based on such information.

Figure 10:
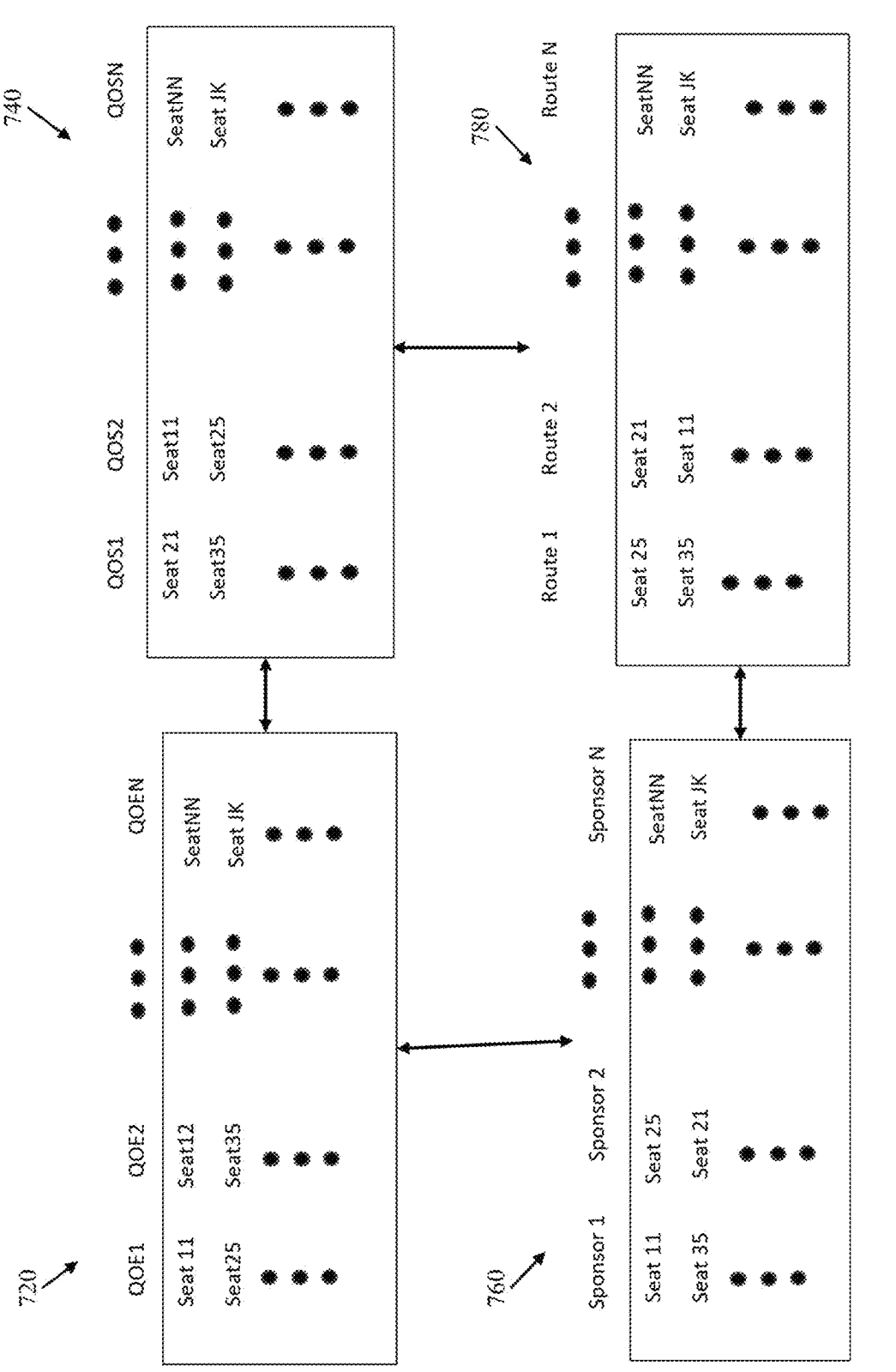
FIG. 10 shows an example of grouping of passenger devices into different groups to provide data service connectivity based on some implementations of the disclosed technology.

FIG. 10 depicts one example of grouping of PEDs into different groups to provide data service connectivity, e.g., based on QoS information. Left-top box 720 shows grouping of PEDs by associating them with seats of the commercial passenger vehicle according to a class or a level of a quality of experience. Right-top box 740 shows grouping of PEDs by associating them with seats of the commercial passenger vehicle according to a class or a level of a quality of service. Left-bottom box 760 shows grouping of PEDs by associating them with seats of the commercial passenger vehicle according to a potential sponsor of the data service connectivity. Right-bottom box 780 shows grouping of PEDs by associating them with seats of the commercial passenger vehicle according to a planned route of travel. It will be appreciated that a given PED may belong to multiple groupings according to ongoing operation, and the grouping(s) to which the PED belongs may change over the duration of a flight (e.g., based on its geographic location). In addition, the conditions shown in FIG. 10 for grouping passengers' mobile devices are examples only and the grouping of the mobile devices can be done in various manners.

Referring back to FIG. 9, at operation 610, the DTAS identifies characteristics of groups of passenger devices. As discussed with regard to FIG. 3, the DTAS identifies the passenger devices automatically or after receiving requests from the passenger devices. In this implementation, the passenger devices are grouped to form a corresponding group and the DTAS can identify the passenger devices together with their group information. For example, when the passenger devices are grouped into different groups, the DTAS can receive characteristics of each group together with corresponding mobile device information of each group.

At operation 620, the DTAS checks with the first candidate regarding sponsorship for a group of passenger devices. The first candidate may be predetermined according to the algorithm stored in the DTAS. For example, the first candidate may be one of wireless service providers. When the first candidate agrees to sponsor the corresponding group of the mobile devices to provide wireless connection services to the mobile devices in the group, the DTAS calculates the service performance metrics at operation 615. Then, at operation 630, the DTAS provides the wireless connection services for the passenger by establishing data connectivity for the passenger device based on the calculated service performance metrics.

When it is determined that the first candidate doesn't sponsor the corresponding group, the DTAS checks with a next candidate to sponsor the corresponding group until the DTAS finds a sponsor for the group according to the predetermined algorithm. Thus, the operation of checking with candidates for sponsorship for the group of passenger devices repeats until the sponsorship for the group of mobile devices is determined. Once it is determined who sponsors the group of mobile devices at operation 620, the service performance metrics are calculated at operation 620. At operation 630, the DTAS provides the wireless connection services for the passenger by establishing data connectivity for the passenger device based on the calculated service performance metrics.

FIG. 11 is an example flowchart of operations that are performed by a dynamic transaction allocation system (DTAS) based on some implementations of the disclosed technology. The example as shown in FIG. 11 determines the sponsorship for groups of passenger devices, when the grouping(s) to which the passenger devices belong change over the duration of a flight (e.g., based on its geographic location).

At operation 810, the DTAS identifies characteristics of groups of passenger devices. At operation 820, the DTAS requests one or more service providers to sponsor the groups of passenger devices. In this case, the one or more service providers may be the matching candidate sponsors according to the predetermined algorithm based on characteristics of the groups of passenger devices. While FIG. 11 shows the Wi-Fi services as the example, other wireless connection services can be provided based on the operations as shown in FIG. 11 according to the communication protocols. At operation 830, a network quality of service matric is calculated to optimize Quality of Service (QoS) and Quality of Experience (QoE) for each passenger device based on availability of the one or more service providers that can provide the payment for the Wi-Fi services in a current geographic heterogenous network or satellite configuration for each in the groups of respective passenger devices. At operation 840, the DTAS requests one or more sponsorship or class programs to sponsor the groups of passenger devices. This request may be sent in response to the change of grouping(s) of mobile devices. The DTAS monitors the grouping of the passenger devices and if there are any changes to the groupings, the DTAS may make a request for the corresponding groups. At operation 850, the DTAS requests the payment for the Wi-Fi services based on availability of the one or more orbital or satellite class of services from the one or more service providers or the one or more sponsorship or class programs. At operation 860, the DTAS recalculates the network quality of service matric that optimizes the Quality of Service (QoS) and Quality of Experience (QoE) for each passenger device based on availability of the sponsorship classes or class programs and/or one or more orbital or satellite class of services or by private payment by a passenger that can provide the Wi-Fi services. At operation 870, the DTAS authorizes and authenticates by the network server application of the groups of the passenger devices and implement the network quality of service matric.

A first set of technical solutions adopted by preferred embodiments includes the following:

1. A data connectivity method, comprising: receiving, by a connectivity server onboard a commercial passenger vehicle, one or more data connectivity requests from one or more passenger electronic devices (PEDs); determining a quality of service (QoS) tier associated with each of the one or more PEDs; and establishing data connectivity for the one or more PEDs according to a respective (QoS) tier using a communication protocol that defines an order in which one of a plurality of connectivity service providers is identified for providing connectivity above layer 1.

2. The system of solution 1, wherein the order is received from an airline operating the commercial passenger vehicle.

3. The system of any of above solutions, wherein the plurality of connectivity service providers includes airlines, a phone network operator, a promotional service provider or a satellite service provider.

4. A method of managing quality of service of a data connection, comprising: collecting, during a travel of a commercial passenger vehicle across multiple heterogenous networks, each having a respective authentication, authorization and accounting (AAA) function, quality of service (QoS) information of the PEDs; and providing data connectivity to the PEDs during travel across the multiple heterogenous networks by optimizing a target QoS metric.

6. The method of any of above solutions, including: performing an auction process in which connectivity services provides in the heterogenous networks are provided an opportunity to make a bid for providing data connectivity to the PEDs.

7. A bidding server and a method of bidding for data service connectivity according to the techniques described herein.

8. A QoS server and a method of providing QoS information performed by a connectivity service provider described herein.

9. An apparatus comprising one or more processors configured to implement a method of any of above solutions.

10. A computer-readable storage medium having code stored thereon, the code, upon execution by one or more processors, causing the one or more processors to implement an above-recited method.

A second set of technical solutions adopted by preferred embodiments include the following:

1. A method (e.g., method 1200 as shown in FIG. 12) for providing data connectivity for a passenger in a commercial passenger vehicle, comprising: receiving 1202, by a server onboard a commercial passenger vehicle, one or more data connectivity requests from one or more passenger electronic devices (PEDs) associated with one or more passengers; obtaining 1204 passenger information associated with the one or more passengers; performing 1206, based on the passenger information, an authenticated communication based on the passenger information with one or more service provider candidates according to an order that defines priorities of the one or more service provider candidates such that the authenticated communication with a second service provider candidate is performed after it is determined that a first service provider candidate is unable to meet one or more constraints that are predetermined for providing wireless connection services for a PED associated with a particular passenger; establishing 1208, based on the authenticated communication, data connectivity for the PED associated with the particular passenger.

2. The method of solution 1, wherein the one or more constraints includes at least one of an ability to sponsor costs for providing the wireless connection services for the PED associated with the particular passenger or an ability to provide a predetermined level of service quality measurements.

3. The method of solution 1, wherein the performing the authenticated communication includes: sending a request message to the first service provider candidate to confirm whether to sponsor costs for providing the wireless connection services for the PED associated with the particular passenger; and receiving a response message from the first service provider candidate that approves or disapproves the costs.

4. The method of solution 1, wherein the data connectivity is established above a physical layer level according to a communication protocol that defines a communication hierarchy among different layers.

5. The method of solution 1, further comprising: requesting the PED associated with the particular passenger to make a direct payment for the wireless connection services.

6. The method of solution 1, further comprising: requesting the PED associated with the particular passenger to view an advertisement to be displayed on the PED or participate in a survey to establish the data connectivity for the PED, wherein the advertisement or the survey is determined based on the passenger information associated with the particular passenger.

7. The method of solution 1, further comprising selecting, from the one or more service provider candidates, a connectivity service provider that is able to meet the one or more constraints, wherein the connectivity service provider is selected based on a type of the wireless connection services and a capability of a transceiver of the commercial passenger vehicle.

8. The method of solution 1, further comprising performing an auction process in which the one or more service provider candidates are provided an opportunity to make a bid for providing the data connectivity to the PED associated with the particular passenger.

9. The method of solution 1, further comprising: calculating service performance metrics to satisfy predetermined conditions related to quality of the wireless connection services, wherein the data connectivity is established based on the service performance metrics.

10. The method of solution 1, wherein the one or more service provider candidates include at least one of airlines, credit card companies, hotels, rental car companies, retail rewards programs, frequent flyer programs, loyalty programs, affiliation programs, corporate partnerships, advertising companies, or survey programs.

11. A system for providing data connectivity for a passenger in a commercial passenger vehicle, comprising: a server located in the commercial passenger vehicle and configured to communicate with a ground server outside of the commercial passenger vehicle and a passenger device associated with a passenger, wherein the server includes: a real-time communication component configured to perform an authenticated communication with one or more service provider candidates according to an order that defines priorities of the one or more service provider candidates such that the authenticated communication with a second service provider candidate is performed after it is determined that a first service provider candidate is unable to meet one or more constraints that are predetermined for providing wireless connection services for a PED associated with a particular passenger; a processor configured to calculate service performance metrics to satisfy predetermined conditions related to quality of the wireless connection services to be provided to the PED; and an interface that is configured to establish, based on the authenticated communication and the service performance metrics, data connectivity for the PED associated with the particular passenger.

12. The system of solution 11, wherein the data connectivity is established above a physical layer level according to a communication protocol that defines a communication hierarchy among different layers.

13. The system of solution 11, wherein the server is further configured to collect, during a travel of the commercial passenger vehicle across multiple heterogenous networks including at least two of low earth orbit satellites, geostationary earth orbit satellites, or medium earth orbit satellites, each network having a respective authentication, authorization and accounting (AAA) function, quality of service (QoS) information of the PED.

14. The system of solution 11, wherein the server is further configured to run a machine learning algorithm that is designed to evaluate feedback data from the PED and determine a revised service provider for the PED based on the feedback data.

15. The system of solution 11, wherein the server is further configured to: select, from the one or more service provider candidates, a connectivity service provider that is able to meet the one or more constraints, or request the PED associated with the particular passenger to view an advertisement to be displayed on the PED or participate in a survey.

16. The system of solution 11, wherein the server is configured to initiate the authenticated communication in response to identifying a presence of the PED in the commercial passenger vehicle.

17. A computer-readable storage medium having code stored thereon, the code, upon execution by one or more processors, causing the one or more processors to implement a method comprising: receiving one or more data connectivity requests from one or more passenger electronic devices (PEDs) associated with one or more passengers; obtaining passenger information associated with the one or more passengers; performing, based on the passenger information, an authenticated communication based on the passenger information with one or more service provider candidates according to an order that defines priorities of the one or more service provider candidates such that the authenticated communication with a second service provider candidate is performed after it is determined that a first service provider candidate is unable to meet one or more constraints that are predetermined for providing wireless connection services for a PED associated with a particular passenger; establishing, based on the authenticated communication, data connectivity for the PED associated with the particular passenger.

18. The computer-readable storage medium of solution 17, wherein the data connectivity is established above a physical layer level according to a communication protocol that defines a communication hierarchy among different layers.

19. The computer-readable storage medium of solution 17, wherein the method comprises performing an auction process in which service provider candidates are provided an opportunity to make a bid for providing the data connectivity to the PED.

20. The computer-readable storage medium of solution 17, wherein the method comprises calculating service performance metrics to satisfy predetermined conditions related to quality of the wireless connection services, and wherein the data connectivity is established based on the service performance metrics.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A method for providing data connectivity for a passenger in a commercial passenger vehicle, comprising:

receiving, by an onboard server located in the commercial passenger vehicle, one or more data connectivity requests from one or more passenger electronic devices (PEDs) associated with one or more passengers, the onboard server communicatively coupled to the PEDs, and one or more ground servers, and one or more service provider candidates;

obtaining, by the onboard server, passenger information associated with the one or more passengers from at least one of a database onboard the commercial passenger vehicle or the one or more ground servers;

performing, based on the passenger information, an authenticated communication based on the passenger information with the one or more service provider candidates according to an order that defines priorities of the one or more service provider candidates such that the authenticated communication with a second service provider candidate is performed after it is determined that a first service provider candidate is unable to meet one or more constraints that are predetermined for providing wireless connection services for a PED associated with a particular passenger;

establishing, based on the authenticated communication, data connectivity for the PED associated with the particular passenger, and wherein the performing the authenticated communication includes:

sending, to the first service provider candidate, a first request message that requests the first service provider candidate to confirm whether to sponsor costs for providing the wireless connection services for the PED associated with the particular passenger;

receiving, from the first service provider candidate, a first response message that approves or disapproves the costs; and wherein the method further comprises, in response to the first response message disapproving the costs, i) sending, to the second service provider candidate, a second request message that requests the second service provider candidate to confirm whether to sponsor the costs for providing the wireless connection services for the PED associated with the particular passenger;

ii) receiving, from the second service provider candidate, a second response message from the second service provider candidate that approves or disapproves the costs; and iii) in response to the second response message disapproving the costs, requesting by the onboard server to the PED associated with the particular passenger to confirm whether the particular passenger agrees to make a direct payment for the costs, or in response to the second response message approving the costs, proceeding to provide the wireless connection services for the PED associated with the particular passenger by allocating the costs to the second service provider candidate.

2. The method of claim 1, wherein the one or more constraints includes at least one of an ability to sponsor costs for providing the wireless connection services for the PED associated with the particular passenger or an ability to provide a predetermined level of service quality measurements.

3. The method of claim 1, wherein the data connectivity is established above a physical layer level according to a communication protocol that defines a communication hierarchy among different layers.

4. The method of claim 1, further comprising: requesting the PED associated with the particular passenger to view an advertisement to be displayed on the PED or participate in a survey to establish the data connectivity for the PED, wherein the advertisement or the survey is determined based on the passenger information associated with the particular passenger.

5. The method of claim 1, further comprising selecting, from the one or more service provider candidates, a connectivity service provider that is able to meet the one or more constraints, wherein the connectivity service provider is selected based on a type of the wireless connection services and a capability of a transceiver of the commercial passenger vehicle.

6. The method of claim 1, further comprising performing an auction process in which the one or more service provider candidates are provided an opportunity to make a bid for providing the data connectivity to the PED associated with the particular passenger.

7. The method of claim 1, further comprising:

calculating service performance metrics to satisfy predetermined conditions related to quality of the wireless connection services, and wherein the data connectivity is established based on the service performance metrics.

8. The method of claim 1, wherein the one or more service provider candidates include at least one of airlines, credit card companies, hotels, rental car companies, retail rewards programs, frequent flyer programs, loyalty programs, affiliation programs, corporate partnerships, advertising companies, or survey programs.

9. A system for providing data connectivity for a passenger in a commercial passenger vehicle, comprising:

a server located in the commercial passenger vehicle and configured to communicate with a ground server outside of the commercial passenger vehicle and one or more passenger electronic devices (PEDs) associated with one or more passengers, wherein the server includes:

a real-time communication component configured to perform an authenticated communication with one or more service provider candidates according to an order that defines priorities of the one or more service provider candidates such that the authenticated communication with a second service provider candidate is performed after it is determined that a first service provider candidate is unable to meet one or more constraints that are predetermined for providing wireless connection services for a PED associated with a particular passenger;

a processor configured to calculate service performance metrics to satisfy predetermined conditions related to quality of the wireless connection services to be provided to the PED; and an interface that is configured to establish, based on the authenticated communication and the service performance metrics, data connectivity for the PED associated with the particular passenger, wherein the real-time communication component is further configured to:

send, to the first service provider candidate, a first request message that requests the first service provider candidate to confirm whether to sponsor costs for providing the wireless connection services for the PED associated with the particular passenger;

receive, from the first service provider candidate, a first response message that approves or disapproves the costs; and wherein in response to the first response message disapproving the costs, the real-time communication component is further configured to:

i) send, to the second service provider candidate, a second request message that requests the second service provider candidate to confirm whether to sponsor the costs for providing the wireless connection services for the PED associated with the particular passenger;

ii) receive, from the second service provider candidate, a second response message from the second service provider candidate that approves or disapproves the costs; and iii) in response to the second response message disapproving the costs, request by the server to the PED associated with the particular passenger to confirm whether the particular passenger agrees to make a direct payment for the costs, or in response to the second response message approving the costs, proceeding to provide the wireless connection services for the PED associated with the particular passenger by allocating the costs to the second service provider candidate.

10. The system of claim 9, wherein the data connectivity is established above a physical layer level according to a communication protocol that defines a communication hierarchy among different layers.

11. The system of claim 9, wherein the server is further configured to collect, during a travel of the commercial passenger vehicle across multiple heterogenous networks including at least two of low earth orbit satellites, geostationary earth orbit satellites, or medium earth orbit satellites, each network having a respective authentication, authorization and accounting (AAA) function, quality of service (QOS) information of the PED.

12. The system of claim 9, wherein the server is further configured to run a machine learning algorithm that is designed to evaluate feedback data from the PED and determine a revised service provider for the PED based on the feedback data.

13. The system of claim 9, wherein the server is further configured to:

select, from the one or more service provider candidates, a connectivity service provider that is able to meet the one or more constraints, or request the PED associated with the particular passenger to view an advertisement to be displayed on the PED or participate in a survey.

14. The system of claim 9, wherein the server is configured to initiate the authenticated communication in response to identifying a presence of the PED in the commercial passenger vehicle.

15. A non-transitory computer-readable storage medium having code stored thereon, the code, upon execution by one or more processors, causing the one or more processors to implement a method comprising:

receiving one or more data connectivity requests from one or more passenger electronic devices (PEDs) associated with one or more passengers;

obtaining passenger information associated with the one or more passengers;

performing, based on the passenger information, an authenticated communication based on the passenger information with one or more service provider candidates according to an order that defines priorities of the one or more service provider candidates such that the authenticated communication with a second service provider candidate is performed after it is determined that a first service provider candidate is unable to meet one or more constraints that are predetermined for providing wireless connection services for a PED associated with a particular passenger;

establishing, based on the authenticated communication, data connectivity for the PED associated with the particular passenger, and wherein the performing the authenticated communication includes:

sending, to the first service provider candidate, a first request message that requests the first service provider candidate to confirm whether to sponsor costs for providing the wireless connection services for the PED associated with the particular passenger;

receiving, from the first service provider candidate, a first response message that approves or disapproves the costs; and wherein the method further comprises, in response to the first response message disapproving the costs, i) sending, to the second service provider candidate, a second request message that requests the second service provider candidate to confirm whether to sponsor the costs for providing the wireless connection services for the PED associated with the particular passenger;

ii) receiving, from the second service provider candidate, a second response message from the second service provider candidate that approves or disapproves the costs; and iii) in response to the second response message disapproving the costs, requesting to the PED associated with the particular passenger to confirm whether the particular passenger agrees to make a direct payment for the costs, or in response to the second response message approving the costs, proceeding to provide the wireless connection services for the PED associated with the particular passenger by allocating the costs to the second service provider candidate.

16. The non-transitory computer-readable storage medium of claim 15, wherein the data connectivity is established above a physical layer level according to a communication protocol that defines a communication hierarchy among different layers.

17. The non-transitory computer-readable storage medium of claim 15, wherein the method comprises performing an auction process in which service provider candidates are provided an opportunity to make a bid for providing the data connectivity to the PED.

18. The non-transitory computer-readable storage medium of claim 15, wherein the method comprises calculating service performance metrics to satisfy predetermined conditions related to quality of the wireless connection services, and wherein the data connectivity is established based on the service performance metrics.

* * * * *